US012640648B2

(12) United States Patent
Ramesh et al.

(10) Patent No.: US 12,640,648 B2
(45) Date of Patent: May 26, 2026

(54) CONTROL OF HYSTERETIC CURRENT MODE MULTILEVEL BUCK CONVERTER

(71) Applicant: Renesas Electronics America Inc., Milpitas, CA (US)

(72) Inventors: Rahul Ramesh, Cary, NC (US); Sungkeun Lim, Apex, NC (US); Yen-Mo Chen, Morrisville, NC (US); Shahriar Jalal Nibir, Apex, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 224 days.

(21) Appl. No.: 18/500,360

(22) Filed: Nov. 2, 2023

(65) Prior Publication Data

US 2024/0258920 A1      Aug. 1, 2024

Related U.S. Application Data

(60) Provisional application No. 63/441,312, filed on Jan. 26, 2023.

(51) Int. Cl.
| | |
|---|---|
| *H02M 7/483* | (2007.01) |
| *H02M 1/00* | (2006.01) |
| *H02M 3/07* | (2006.01) |
| *H02M 3/158* | (2006.01) |

(52) U.S. Cl.
CPC ......... *H02M 3/158* (2013.01); *H02M 1/0003* (2021.05); *H02M 1/0095* (2021.05); *H02M 3/07* (2013.01); *H02M 7/4837* (2021.05)

(58) Field of Classification Search
CPC .... H02M 3/158; H02M 3/156; H02M 3/1563; H02M 3/1566; H02M 3/157; H02M 3/1582; H02M 3/1586; H02M 3/07; H02M 3/071; H02M 3/073; H02M 7/4837; H02M 7/487; H02M 7/49; H02M 7/4833; H02M 7/4835; H02M 7/483; H02M 1/0003; H02M 1/0006; H02M 1/0009; H02M 1/0012; H02M 1/0095; H02M 1/0096

See application file for complete search history.

(56) References Cited

U.S. PATENT DOCUMENTS

| | | | | |
|---|---|---|---|---|
| 2016/0329809 | A1* | 11/2016 | Granato | ................ H02M 3/158 |
| 2018/0042232 | A1* | 2/2018 | Rowland | ................ A01N 43/40 |
| 2022/0224231 | A1* | 7/2022 | Rizzolatti | ............... H02M 3/07 |

* cited by examiner

*Primary Examiner* — Nguyen Tran
(74) *Attorney, Agent, or Firm* — SCULLY, SCOTT, MURPHY & PRESSER, P.C.

(57) ABSTRACT

A method of controlling a multilevel power converter may include measuring an input voltage at a converter input, determining a half input voltage based on the input voltage; measuring a flying capacitor voltage across the flying capacitor; determining an error voltage based on a difference between the flying capacitor voltage and the half input voltage; generating an inductor current window having an inductor peak current and a valley inductor current; modulating the inductor peak current into an upper inductor peak current and a lower inductor peak current based on the error voltage; and operating the multilevel power converter to produce an output current through an inductor to a converter output, the output current being within the inductor current window and based on a sequence of pulse width modulation states.

11 Claims, 17 Drawing Sheets

| Duty Mode and Voltage Range | PWM States 614 | Q4 | Q3 | Q2 | Q1 | Selected $I_L$ Peak | Description |
|---|---|---|---|---|---|---|---|
| High Duty Mode 602 :<br><br>Vout > Vin/2 + Duty Threshold 604 | S1-H | ON | ON | OFF | OFF | LOWER | Inductor Magnetizing |
| | S2-H | ON | OFF | ON | OFF | LOWER | Inductor Demagnetizing + Cfly Charging |
| | S3-H | ON | ON | OFF | OFF | UPPER | Inductor Magnetizing |
| | S4-H | OFF | ON | OFF | ON | UPPER | Inductor Demagnetizing + Cfly Discharging |
| Mid Duty Mode 606 :<br><br>Vout ≤ Vin/2 + Duty Threshold 604<br>AND<br>Vout ≥ Vin/2 − Duty Threshold 604 | S1-M | ON | ON | OFF | OFF | LOWER | Inductor Magnetizing |
| | S2-M | ON | OFF | ON | OFF | LOWER | Cfly Charging |
| | S3-M | OFF | OFF | ON | ON | UPPER | Inductor Demagnetizing |
| | S4-M | OFF | ON | OFF | ON | UPPER | Cfly Discharging |
| Low Duty Mode 610 :<br><br>Vout < Vin/2 − Duty Threshold 604 | S1-L | ON | OFF | ON | OFF | LOWER | Inductor Magnetizing + Cfly Charging |
| | S2-L | OFF | OFF | ON | ON | LOWER | Inductor Demagnetizing |
| | S3-L | OFF | ON | OFF | ON | UPPER | Inductor Magnetizing + Cfly Discharging |
| | S4-L | OFF | OFF | ON | ON | UPPER | Inductor Demagnetizing |

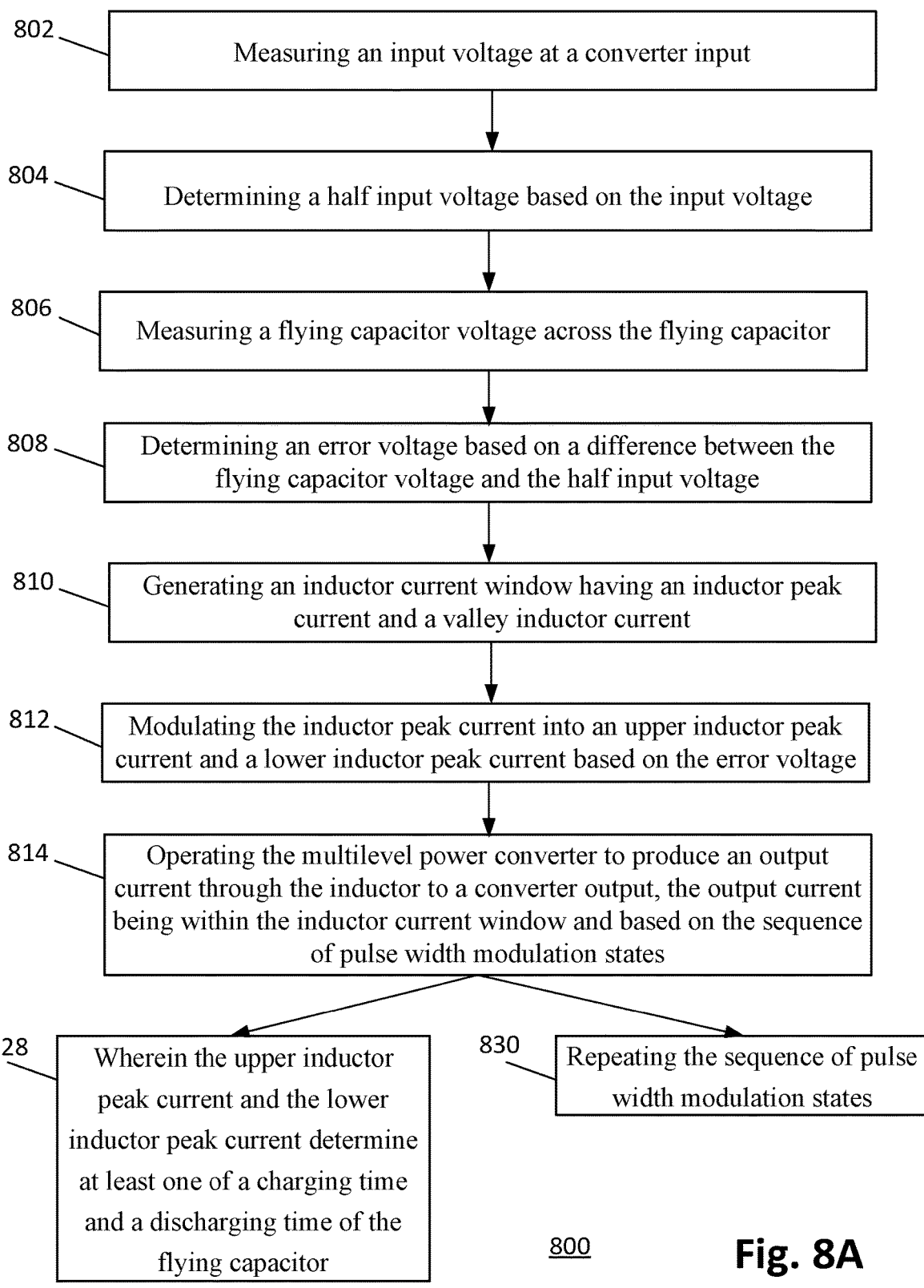

802 — Measuring an input voltage at a converter input

804 — Determining a half input voltage based on the input voltage

806 — Measuring a flying capacitor voltage across the flying capacitor

808 — Determining an error voltage based on a difference between the flying capacitor voltage and the half input voltage 810 — Generating an inductor current window having an inductor peak current and a valley inductor current 812 — Modulating the inductor peak current into an upper inductor peak current and a lower inductor peak current based on the error voltage 814 — Operating the multilevel power converter to produce an output current through the inductor to a converter output, the output current being within the inductor current window and based on the sequence of pulse width modulation states 828 — Wherein the upper inductor peak current and the lower inductor peak current determine at least one of a charging time and a discharging time of the flying capacitor 830 — Repeating the sequence of pulse width modulation states

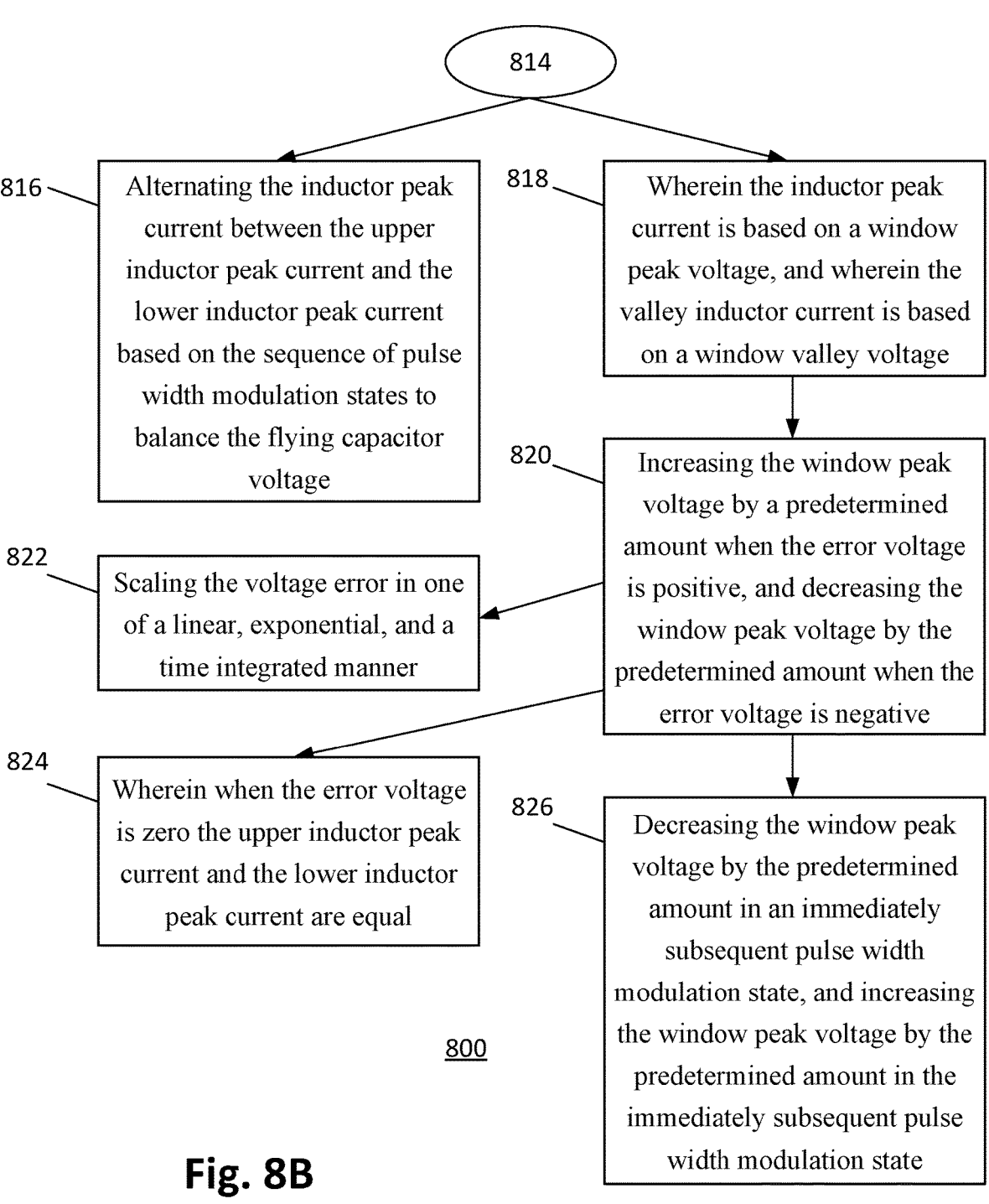

814

816 — Alternating the inductor peak current between the upper inductor peak current and the lower inductor peak current based on the sequence of pulse width modulation states to balance the flying capacitor voltage 818 — Wherein the inductor peak current is based on a window peak voltage, and wherein the valley inductor current is based on a window valley voltage 822 — Scaling the voltage error in one of a linear, exponential, and a time integrated manner 820 — Increasing the window peak voltage by a predetermined amount when the error voltage is positive, and decreasing the window peak voltage by the predetermined amount when the error voltage is negative 824 — Wherein when the error voltage is zero the upper inductor peak current and the lower inductor peak current are equal 826 — Decreasing the window peak voltage by the predetermined amount in an immediately subsequent pulse width modulation state, and increasing the window peak voltage by the predetermined amount in the immediately subsequent pulse width modulation state

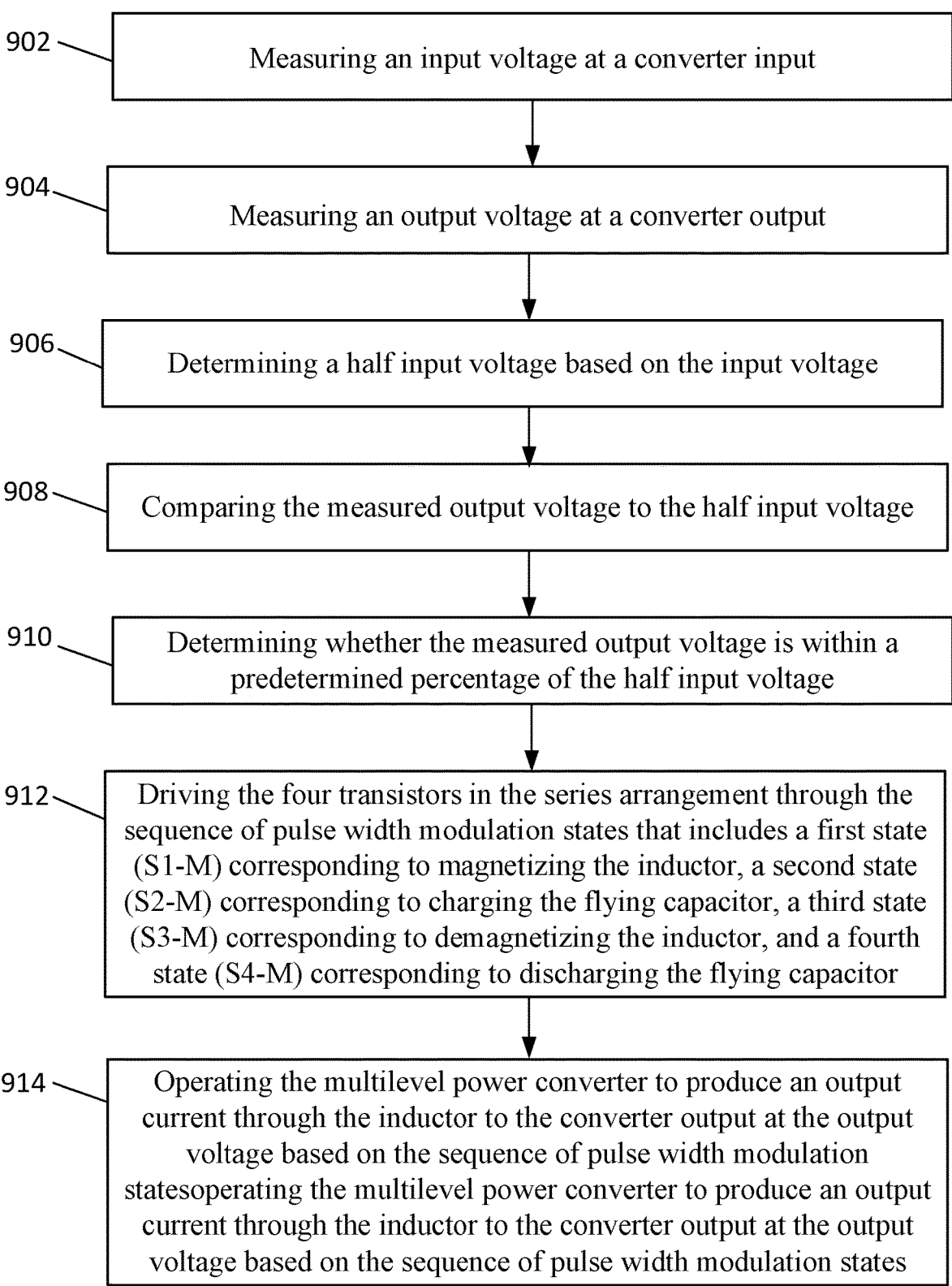

902 — Measuring an input voltage at a converter input

904 — Measuring an output voltage at a converter output

906 — Determining a half input voltage based on the input voltage

908 — Comparing the measured output voltage to the half input voltage

910 — Determining whether the measured output voltage is within a predetermined percentage of the half input voltage 912 — Driving the four transistors in the series arrangement through the sequence of pulse width modulation states that includes a first state (S1-M) corresponding to magnetizing the inductor, a second state (S2-M) corresponding to charging the flying capacitor, a third state (S3-M) corresponding to demagnetizing the inductor, and a fourth state (S4-M) corresponding to discharging the flying capacitor 914 — Operating the multilevel power converter to produce an output current through the inductor to the converter output at the output voltage based on the sequence of pulse width modulation statesoperating the multilevel power converter to produce an output current through the inductor to the converter output at the output voltage based on the sequence of pulse width modulation states

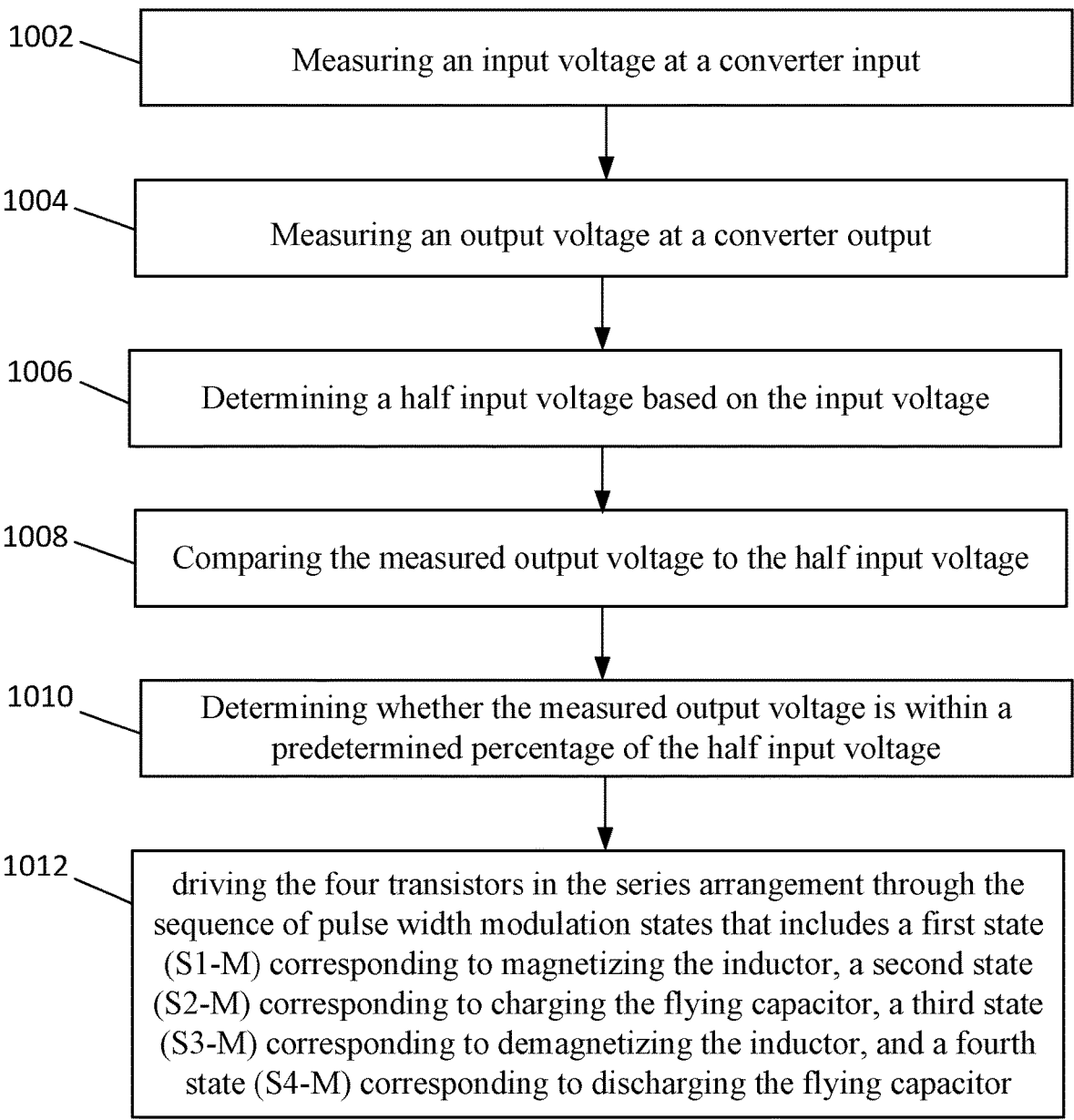

1002 — Measuring an input voltage at a converter input

1004 — Measuring an output voltage at a converter output

1006 — Determining a half input voltage based on the input voltage

1008 — Comparing the measured output voltage to the half input voltage

1010 — Determining whether the measured output voltage is within a predetermined percentage of the half input voltage 1012 — driving the four transistors in the series arrangement through the sequence of pulse width modulation states that includes a first state (S1-M) corresponding to magnetizing the inductor, a second state (S2-M) corresponding to charging the flying capacitor, a third state (S3-M) corresponding to demagnetizing the inductor, and a fourth state (S4-M) corresponding to discharging the flying capacitor

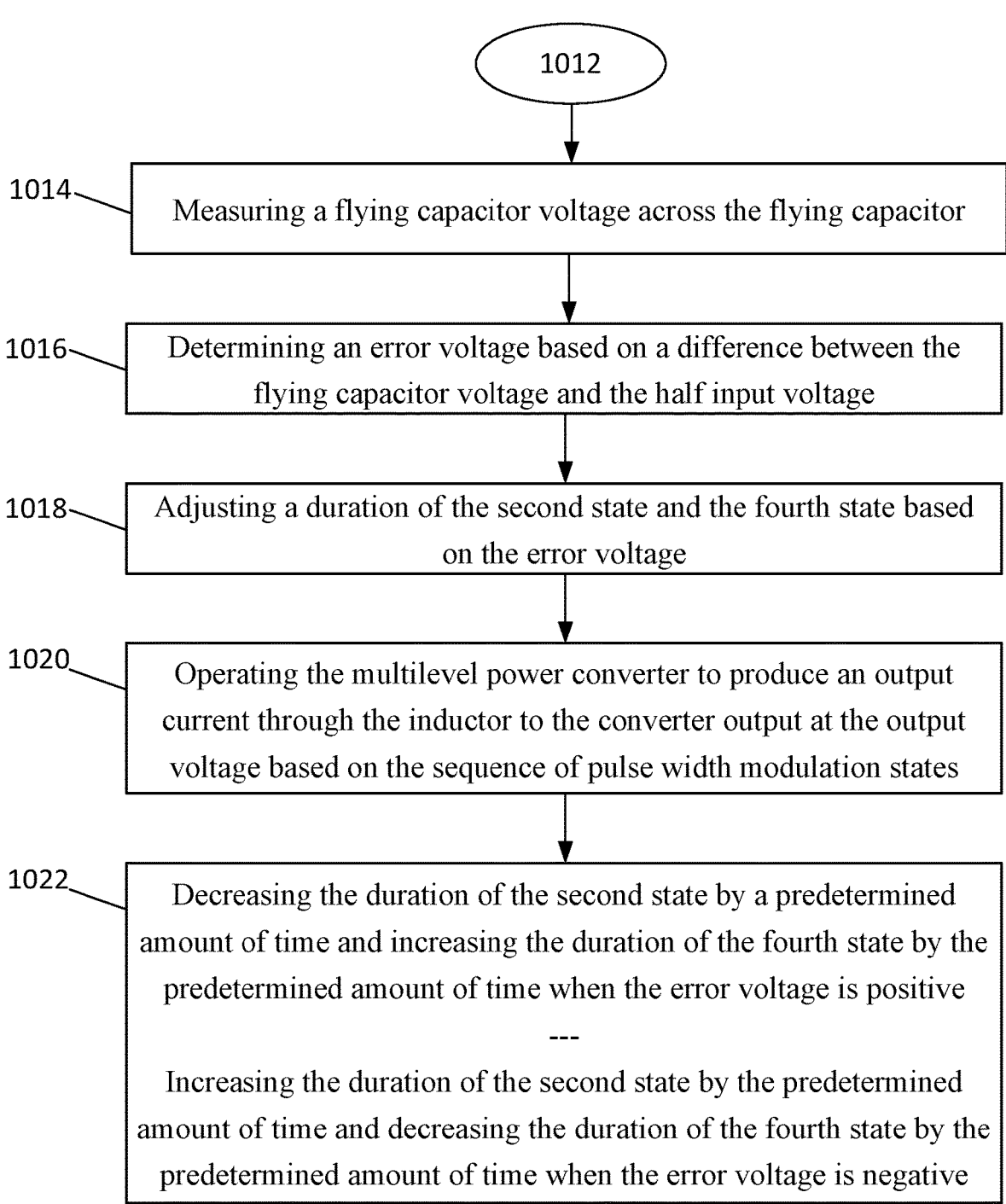

1012

1014 — Measuring a flying capacitor voltage across the flying capacitor

1016 — Determining an error voltage based on a difference between the flying capacitor voltage and the half input voltage 1018 — Adjusting a duration of the second state and the fourth state based on the error voltage 1020 — Operating the multilevel power converter to produce an output current through the inductor to the converter output at the output voltage based on the sequence of pulse width modulation states 1022 — Decreasing the duration of the second state by a predetermined amount of time and increasing the duration of the fourth state by the predetermined amount of time when the error voltage is positive

---

Increasing the duration of the second state by the predetermined amount of time and decreasing the duration of the fourth state by the predetermined amount of time when the error voltage is negative

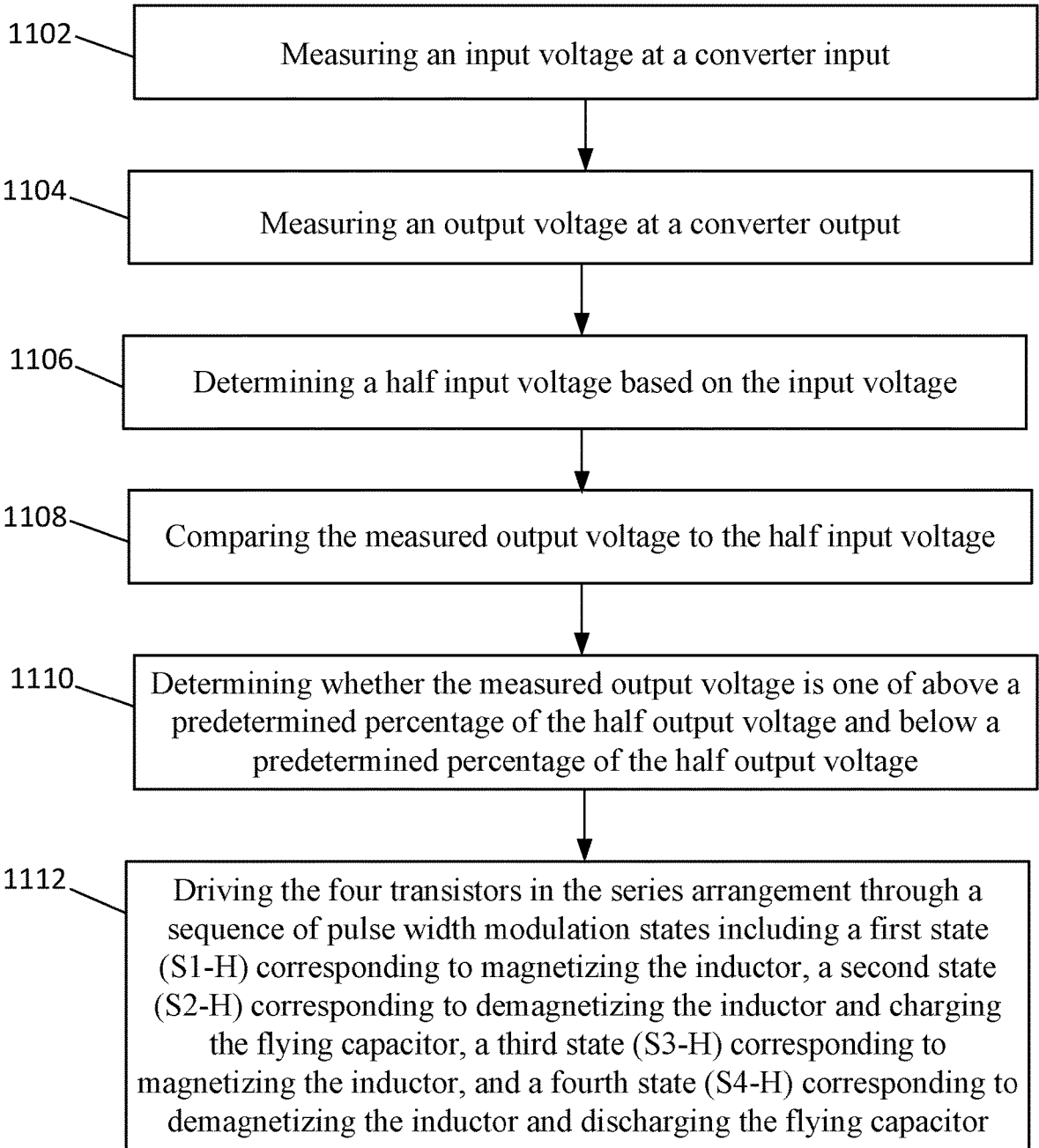

1102 — Measuring an input voltage at a converter input

1104 — Measuring an output voltage at a converter output

1106 — Determining a half input voltage based on the input voltage

1108 — Comparing the measured output voltage to the half input voltage

1110 — Determining whether the measured output voltage is one of above a predetermined percentage of the half output voltage and below a predetermined percentage of the half output voltage 1112 — Driving the four transistors in the series arrangement through a sequence of pulse width modulation states including a first state (S1-H) corresponding to magnetizing the inductor, a second state (S2-H) corresponding to demagnetizing the inductor and charging the flying capacitor, a third state (S3-H) corresponding to magnetizing the inductor, and a fourth state (S4-H) corresponding to demagnetizing the inductor and discharging the flying capacitor

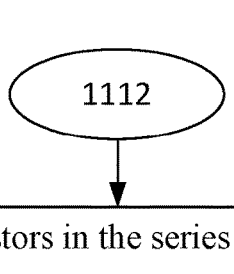

1112

1114 — Driving the four transistors in the series arrangement through a sequence of pulse width modulation states including a first state (S1-L) corresponding to energizing the inductor and charging the flying capacitor, a second state (S2-L) corresponding to demagnetizing the inductor, a third state (S3-L) corresponding to magnetizing the inductor and discharging the flying capacitor, and a fourth state (S4-L) corresponding to demagnetizing the inductor 1116 — Operating the multilevel power converter to produce an output current through the inductor to the converter output at the output voltage based on the sequence of pulse width modulation states 1118 — Repeating the sequence of pulse width modulation states for the high duty mode while the measured output voltage is higher than a predetermined percentage of the half input voltage 1120 — Repeating the sequence of pulse width modulation states for the low duty mode while the measured output voltage is lower than a predetermined percentage of the half input voltage

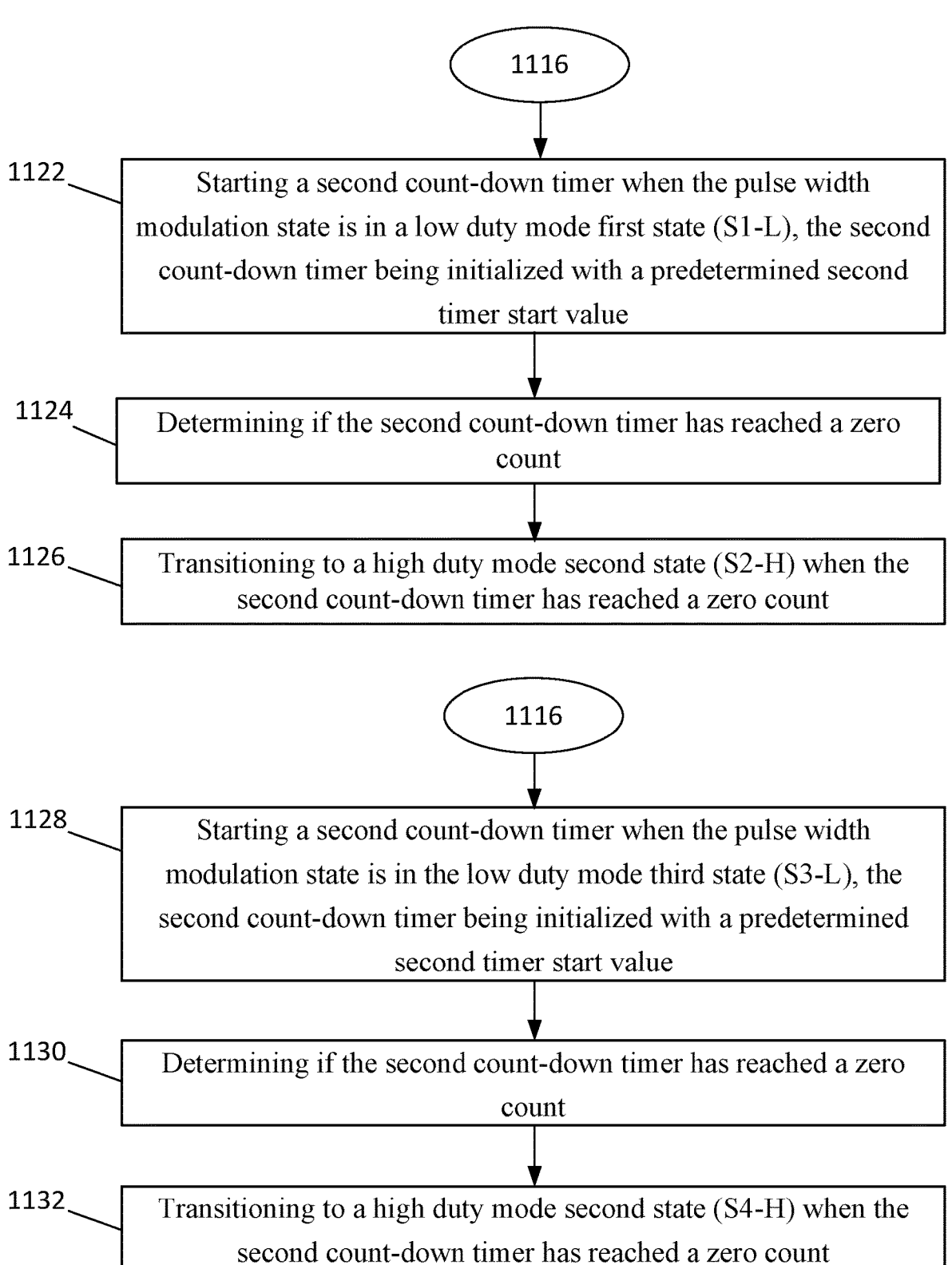

1116

1122 — Starting a second count-down timer when the pulse width modulation state is in a low duty mode first state (S1-L), the second count-down timer being initialized with a predetermined second timer start value 1124 — Determining if the second count-down timer has reached a zero count 1126 — Transitioning to a high duty mode second state (S2-H) when the second count-down timer has reached a zero count

1116

1128 — Starting a second count-down timer when the pulse width modulation state is in the low duty mode third state (S3-L), the second count-down timer being initialized with a predetermined second timer start value 1130 — Determining if the second count-down timer has reached a zero count 1132 — Transitioning to a high duty mode second state (S4-H) when the second count-down timer has reached a zero count

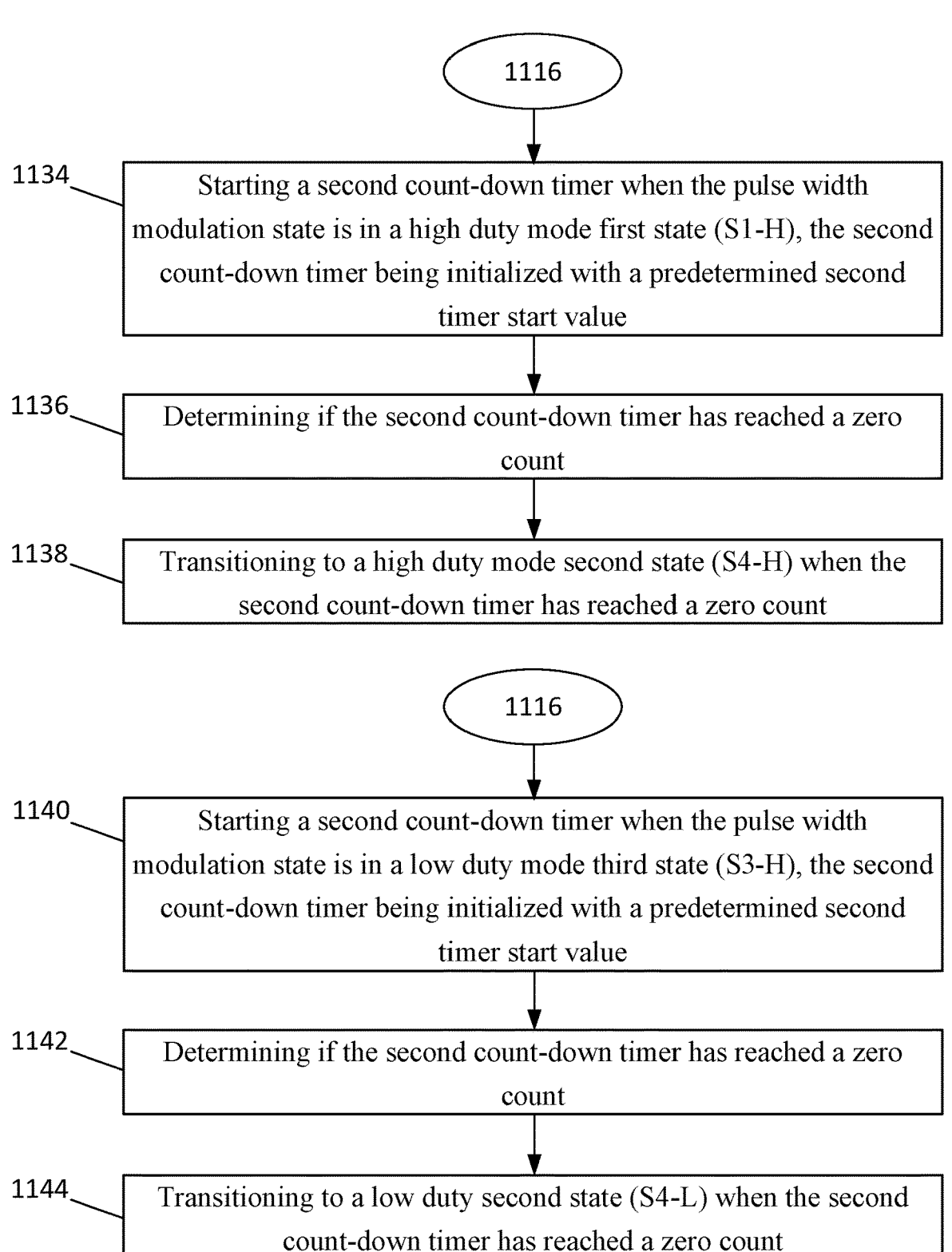

1116

1134 — Starting a second count-down timer when the pulse width modulation state is in a high duty mode first state (S1-H), the second count-down timer being initialized with a predetermined second timer start value 1136 — Determining if the second count-down timer has reached a zero count 1138 — Transitioning to a high duty mode second state (S4-H) when the second count-down timer has reached a zero count

1116

1140 — Starting a second count-down timer when the pulse width modulation state is in a low duty mode third state (S3-H), the second count-down timer being initialized with a predetermined second timer start value 1142 — Determining if the second count-down timer has reached a zero count 1144 — Transitioning to a low duty second state (S4-L) when the second count-down timer has reached a zero count

CONTROL OF HYSTERETIC CURRENT MODE MULTILEVEL BUCK CONVERTER

CROSS-REFERENCE TO RELATED APPLICATION

This application is based upon and claims the benefit of priority under 35 USC 120 of U.S. patent Application No. 63/441,312 filed on Jan. 26, 2023, and titled Control of Hysteretic Current Mode Multilevel Buck Converter, the entire disclosure of which is incorporated herein by reference in its entirety.

BACKGROUND

Unless otherwise indicated herein, the materials described in this section are not prior art to the claims in this application and are not admitted to be prior art by inclusion in this section. The present disclosure relates in general to systems and methods of controlling semiconductor devices, more particularly, to control of a power converter.

A traditional Voltage Mode (VM) or Current Mode (CM) power converter may utilize a fixed switching frequency, while a Hysteretic Mode (HM) power converter may change a switching frequency to adjust an output voltage. A power converter (e.g., a power supply) may operate in different modes depending on the amount of power available in view of an instantaneous load. In some situations, a voltage level on a converter output may be nearly equal to half of a voltage level provided on a converter input which may lead to lower efficiency if this situation persists. Also, to supply power under various load demand scenarios, a power converter may use various components having high power ratings or components that were manufactured to high tolerances leading to higher system cost. What is needed is a solution that addresses these issues, and others.

SUMMARY

According to an example, a method of controlling a multilevel power converter is generally described. The method may include measuring an input voltage at a converter input, the multilevel power converter may include four transistors in a series arrangement, a flying capacitor configured to span a center two transistors in the series arrangement, and an inductor having a first terminal that is connected to an intermediate node that joins the center two transistors, each of the four transistors in the series arrangement being driven by a pulse width modulation signal based on a sequence of pulse width modulation states; determining a half input voltage based on the input voltage; measuring a flying capacitor voltage across the flying capacitor; determining an error voltage based on a difference between the flying capacitor voltage and the half input voltage; generating an inductor current window having an inductor peak current and a valley inductor current; modulating the inductor peak current into an upper inductor peak current and a lower inductor peak current based on the error voltage; and operating the multilevel power converter to produce an output current through the inductor to a converter output, the output current being within the inductor current window and based on the sequence of pulse width modulation states.

According to this example, the method may further include alternating the inductor peak current between the upper inductor peak current and the lower inductor peak current based on the sequence of pulse width modulation states to balance the flying capacitor voltage. The method may include wherein the inductor peak current is based on a window peak voltage, and wherein the valley inductor current is based on a window valley voltage. The method, wherein the step of modulating the inductor peak current into the upper inductor peak current and the lower inductor peak current based on the error voltage, may further include increasing the window peak voltage by a predetermined amount when the error voltage is positive, and decreasing the window peak voltage by the predetermined amount when the error voltage is negative. The method, wherein the step of increasing the window peak voltage by a predetermined amount and the step of decreasing the window peak voltage by the predetermined amount, may further include scaling the voltage error in one of a linear, exponential, and a time integrated manner. The method may include wherein when the error voltage is zero the upper inductor peak current and the lower inductor peak current are equal. The method may further include wherein when the step of increasing the window peak voltage by a predetermined amount when the error voltage is positive occurs in a current pulse width modulation state, the method may further include decreasing the window peak voltage by the predetermined amount in an immediately subsequent pulse width modulation state, and wherein when the step of decreasing the window peak voltage by a predetermined amount when the error voltage is negative occurs in the current pulse width modulation state, the method may further include increasing the window peak voltage by the predetermined amount in the immediately subsequent pulse width modulation state. The method may further include wherein the upper inductor peak current and the lower inductor peak current determine at least one of a charging time and a discharging time of the flying capacitor. The method may further include repeating the sequence of pulse width modulation states.

According to another example, an apparatus is generally described. The apparatus may include a multilevel power converter including a controller, four transistors in a series arrangement, a flying capacitor configured to span a center two transistors in the series arrangement, and an inductor having a first terminal that is connected to an intermediate node that joins the center two transistors, each of the four transistors in the series arrangement being driven by a pulse width modulation signal from the controller based on a sequence of pulse width modulation states, the controller being configured to measure an input voltage at a converter input; determine a half input voltage based on the input voltage; measure a flying capacitor voltage across the flying capacitor; determine an error voltage based on a difference between the flying capacitor voltage and the half input voltage; generate an inductor current window having an inductor peak current and a valley inductor current; modulate the inductor peak current into an upper inductor peak current and a lower inductor peak current based on the error voltage; and operate the multilevel power converter to produce an output current through the inductor to a converter output, the output current being within the inductor current window and based on the sequence of pulse width modulation states.

According to this example, the apparatus may further include wherein the controller is further configured to alternate the inductor peak current between the upper inductor peak current and the lower inductor peak current based on the sequence of pulse width modulation states to balance the flying capacitor voltage.

According to yet another example, a method for controlling a multilevel power converter may include measuring an input voltage at a converter input; measuring an output voltage at a converter output, the multilevel power converter may include four transistors in a series arrangement, a flying capacitor configured to span a center two transistors in the series arrangement, and an inductor having a first terminal that is connected to an intermediate node that joins the center two transistors, each of the four transistors in the series arrangement may be driven by a pulse width modulation signal based on a sequence of pulse width modulation states; determining a half input voltage based on the input voltage; comparing the measured output voltage to the half input voltage; determining whether the measured output voltage is within a predetermined percentage of the half input voltage; when the measured output voltage is within the predetermined percentage of the half input voltage corresponding to a mid duty mode, the method may further include driving the four transistors in the series arrangement through the sequence of pulse width modulation states that includes a first state corresponding to magnetizing the inductor, a second state corresponding to charging the flying capacitor, a third state corresponding to demagnetizing the inductor, and a fourth state corresponding to discharging the flying capacitor; and operating the multilevel power converter to produce an output current through the inductor to the converter output at the output voltage based on the sequence of pulse width modulation states.

According to this example, the method may include repeating the sequence of pulse width modulation states for the mid duty mode while the measured output voltage is within the predetermined percentage of the half input voltage. The method may include wherein the predetermined percentage of the half input voltage is within 5% of the half input voltage. The method may include wherein the predetermined percentage of the half input voltage is within 10% of the half input voltage. The method may include wherein driving the second state and driving the fourth state correspond to driving for a predetermined amount of time. The method may include wherein the predetermined amount of time is equal. The method may include wherein the predetermined amount of time is determined by a first count-down timer, the first count-down timer being initialized with a predetermined first timer start value.

According to yet another example, an apparatus is generally described. The apparatus may include a multilevel power converter with a controller, four transistors in a series arrangement, a flying capacitor configured to span a center two transistors in the series arrangement, and an inductor having a first terminal that is connected to an intermediate node that joins the center two transistors, each of the four transistors in the series arrangement may be driven by a pulse width modulation signal from the controller based on a sequence of pulse width modulation states, the controller may be configured to measure an input voltage at a converter input; measure an output voltage at a converter output, the multilevel power converter including a power stage having four transistors in a series arrangement, the power stage including a flying capacitor configured to span a center two transistors in the series arrangement, the power stage may include an inductor having a first terminal that is connected to an intermediate node that joins the center two transistors, each of the four transistors in the series arrangement being driven by a pulse width modulation signal based on a sequence of pulse width modulation states; determine a half input voltage based on the input voltage; compare the measured output voltage to the half input voltage; determine whether the measured output voltage is within a predetermined percentage of the half input voltage; when the measured output voltage is within the predetermined percentage of the half input voltage corresponding to a mid duty mode, the controller may be further configured to drive the four transistors in the series arrangement through the sequence of pulse width modulation states that includes a first state corresponding to magnetizing the inductor, a second state corresponding to charging the flying capacitor, a third state corresponding to demagnetizing the inductor, and a fourth state corresponding to discharging the flying capacitor; and operate the multilevel power converter to produce an output current through the inductor to the converter output at the output voltage based on the sequence of pulse width modulation states.

According to this example, the controller may be further configured to repeat the sequence of states for the mid duty mode while the measured output voltage is within the predetermined percentage of the half input voltage, wherein the predetermined percentage of the half input voltage is within one of 5% and 10% of the half input voltage, and wherein driving the second state and driving the fourth state corresponds to driving for an equal amount of time.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 6 is a table illustrating various duty modes corresponding to voltage ranges along with corresponding pulse width modulation states, in accordance with various examples of the present disclosure.

FIGS. 8A-8B are a flow diagram illustrating a method for operating a multilevel power converter, in accordance with various examples.

FIGS. 9A-9B are a flow diagram illustrating a method for operating a multilevel power converter, in accordance with various examples.

FIGS. 10A-10B are a flow diagram illustrating a method for operating a multilevel power converter, in accordance with various examples.

FIGS. 11A-11D are a flow diagram illustrating a method for operating a multilevel power converter, in accordance with various examples.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, hysteretic current control of a multilevel power converter can be implemented by a system and method described in accordance with the present disclosure. The system can efficiently provide power to a load such as a laptop computer at a lower cost and greater efficiency. Moreover, the system and method can provide an efficient voltage regulation technique for use with various consumer electronic devices.

Figure 1:
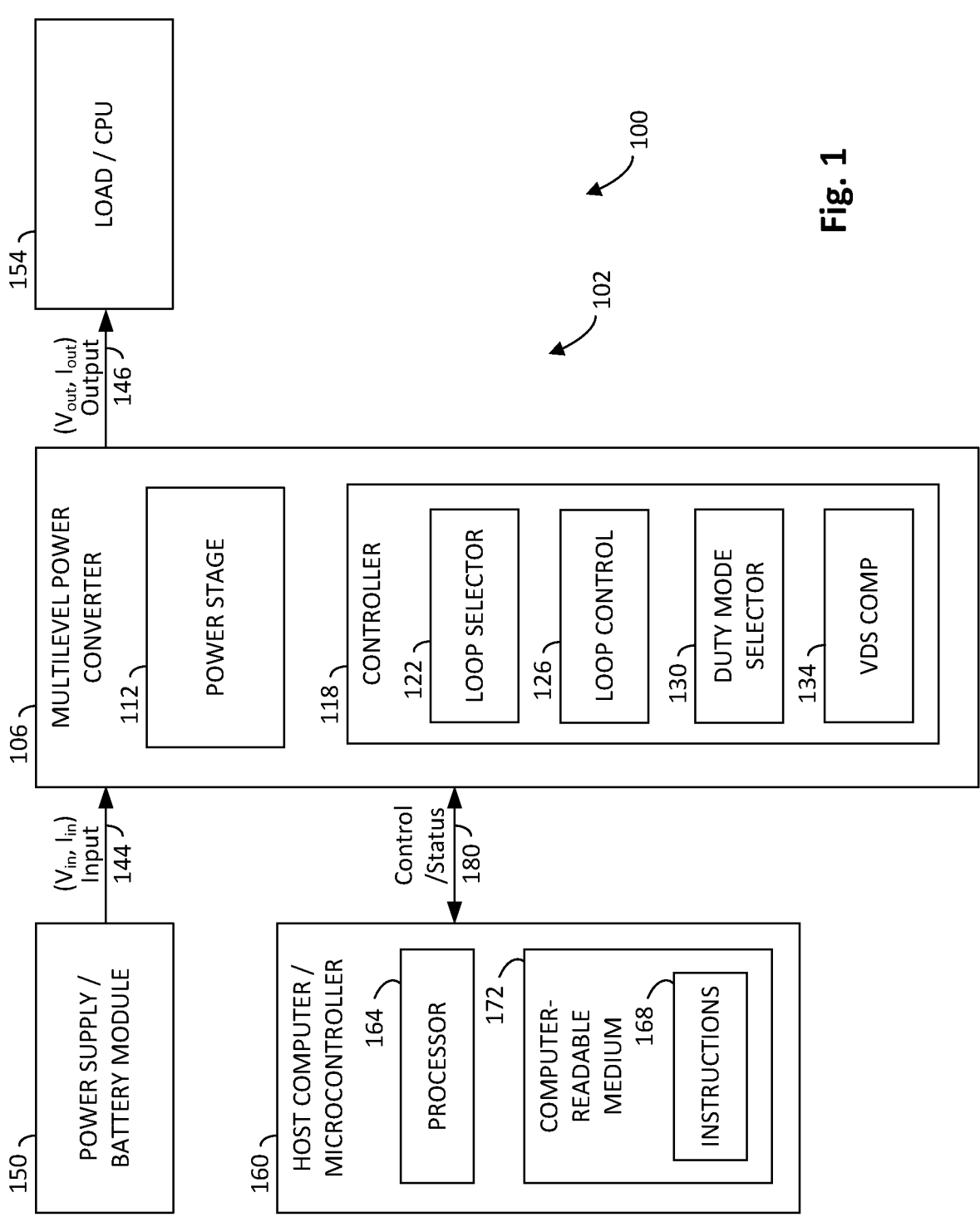
FIG. 1 illustrates an example of an electronic system that can implement hysteretic current control of a multilevel power converter, in accordance with various examples of the present disclosure.

FIG. 1 illustrates an example of an electronic system that can implement hysteretic current control of a multilevel power converter, in accordance with various examples of the present disclosure. Electronic system 100 may include two or more electronic devices or components. Electronic system 100 may be implemented generally as a semiconductor system 100 that may include an electronic device 102 which may be implemented generally as a semiconductor device 102 along with one or more semiconductor circuits, semiconductor chips, memory elements, discrete components, single-ended or bus signals, and the like.

To be described in more detail below, an electronic system 100 may include a multilevel power converter 106, a power supply and/or a battery module 150 configured to provide power (e.g., Vin, Iin) to multilevel power converter 106 at a converter input 144, and a load 154 configured to receive power (e.g., Vout, Iout) from multilevel power convert 106 at a converter output 146. Load 154 may include a central processing unit (CPU), a laptop computer, or other power-consuming device, for example. Multilevel power converter 106 may include a power stage 112 and a controller 118 that further includes a loop selector 122, a loop control 126, a duty mode selector 130, and a drain-to-source voltage (VDS) comparator 134, as will be described more fully below.

System 100 may also include a host computer 160 such as a microcontroller or microcomputer having a processor 164 configured to read and execute computer instructions 168 (e.g., computer implemented code) stored on a non-transitory computer-readable medium 172 a read-only memory (ROM), a random access memory (RAM), a programmable logic device (PLD), a flash drive, a memory card/stick, a solid-state storage device, or the like which may be re-writable, removable, or replaceable to facilitate revision and/or update of computer instructions 168. Host computer 160 may exchange information with and perform configuration of multilevel power converter 106 by sending and/or receiving information over a control and status bus 180. System 100 may also be described as related to an apparatus or device 102 that includes one or more elements, modules, and/or submodules of system 100.

Figure 2:
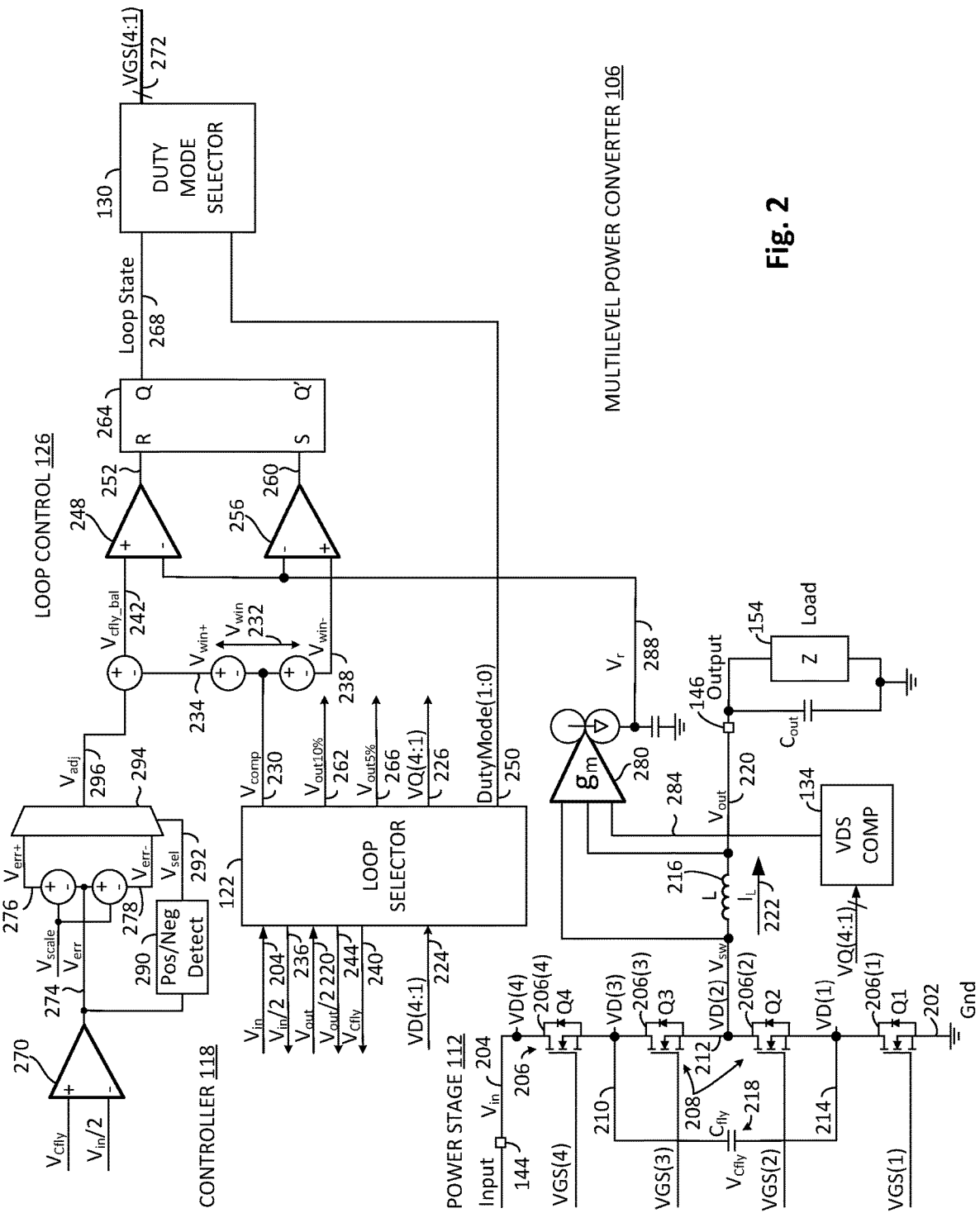
FIG. 2 illustrates details regarding the multilevel power converter of FIG. 1, in accordance with various examples of the present disclosure.

FIG. 2 illustrates details regarding the multilevel power converter of FIG. 1, in accordance with various examples of the present disclosure. According to an example, multilevel power converter 106 may include power stage 112, controller 118, loop selector 122, loop control 126, duty mode selector 130, and drain-to-source voltage (VDS) comparator 134 configured to operate and interact as herein described. Power stage 112 may include four electronic switching elements such as four transistors in a series arrangement 206 with a flying capacitor 218 configured to span a center two transistors 208 in series arrangement 206, and an inductor 216 having a first terminal that is connected to an intermediate node 212 that joins center two transistors 208. Each of the four transistors in the series arrangement 206 (e.g., a first transistor Q1 206(1), a second transistor Q2 206(2), a third transistor Q3 206(3), and a fourth transistor Q4 206(4)) may be driven by a pulse width modulation signal 272 from controller 118 based on a sequence of pulse width modulation states to be described in brief reference to FIG. 5 through FIG. 7.

The four transistors in series arrangement 206 may include n-type (e.g., n-channel), enhancement mode metal oxide semiconductor field effect transistors (MOSFETS) arranged in a chain connecting the source and drain of adjacent transistors in the series. An input voltage Vin 204 may be applied to converter input 144 and connected to a drain terminal of Q4 206(4) at a voltage VD(4). A source terminal of Q4 206(4) may be connected to a drain terminal of Q3 206(3) at a voltage VD(3) at node 210. Similarly, a source terminal of Q3 206(3) may be connected to a drain terminal of Q2 206(2) at a voltage VD(2) at node 212 corresponding to a switching voltage (Vsw) applied to inductor 216. In like manner, a source terminal of Q2 206(2) may be connected to a drain terminal of Q1 206(1) at a voltage VD(1) at node 214. Finally, a source terminal of Q1 206(1) may be connected to an electrical ground (Gnd) at node 202. In this manner, the four transistors 206 may form a series connection between an input voltage Vin 204 and ground 202. Each of the four transistors may be operated or driven by a control signal VGS(4:1) 272. More particularly, VGS(4:1) 272 from duty mode selector 130 may map to VGS(4) applied to a gate terminal of Q4 206(4), VGS(3) applied to a gate terminal of Q3 206(3), VGS(2) applied to a gate terminal of Q2 (206(2), and VGS(1) applied to a gate terminal of Q1 206(1).

Power stage 112 may also include flying capacitor 218 that may be connected to span a center two transistors 208 (e.g., Q3 and Q2) in the series arrangement 206 and may be at a flying capacitor voltage 240 (Vcfly). A second terminal of inductor 216 may be connected to node 220 at an output voltage (Vout) corresponding to converter output 146 to drive load 154. VDS Comp 134 may include two voltage zero cross detectors that may look at the voltages across transistors Q1 206(1) and Q4 206(4) based on VD(4:1), or others as described above. The zero cross detectors may indicate the direction of the flow of current and may be placed to detect and block any current that flows in the reverse direction (e.g., from the output side of inductor 216, node 220, to the input side of inductor 216, node 212). If any negative (e.g., reverse) current is detected, the transistors 206 may be turned off by controller 118. VDS Comp 134 output 284 may function as an enable signal for an operational transconductance amplifier 280 (OTA). An output current 222 across inductor 216 may be measured by OTA 280 and converted to a reference voltage Vr 288 that mimics output current 222. In this manner, reference voltage 288 (Vr) may be a synthesized alternating current (AC) signal that may be used to control output current 222, as further described below.

Figure 3:
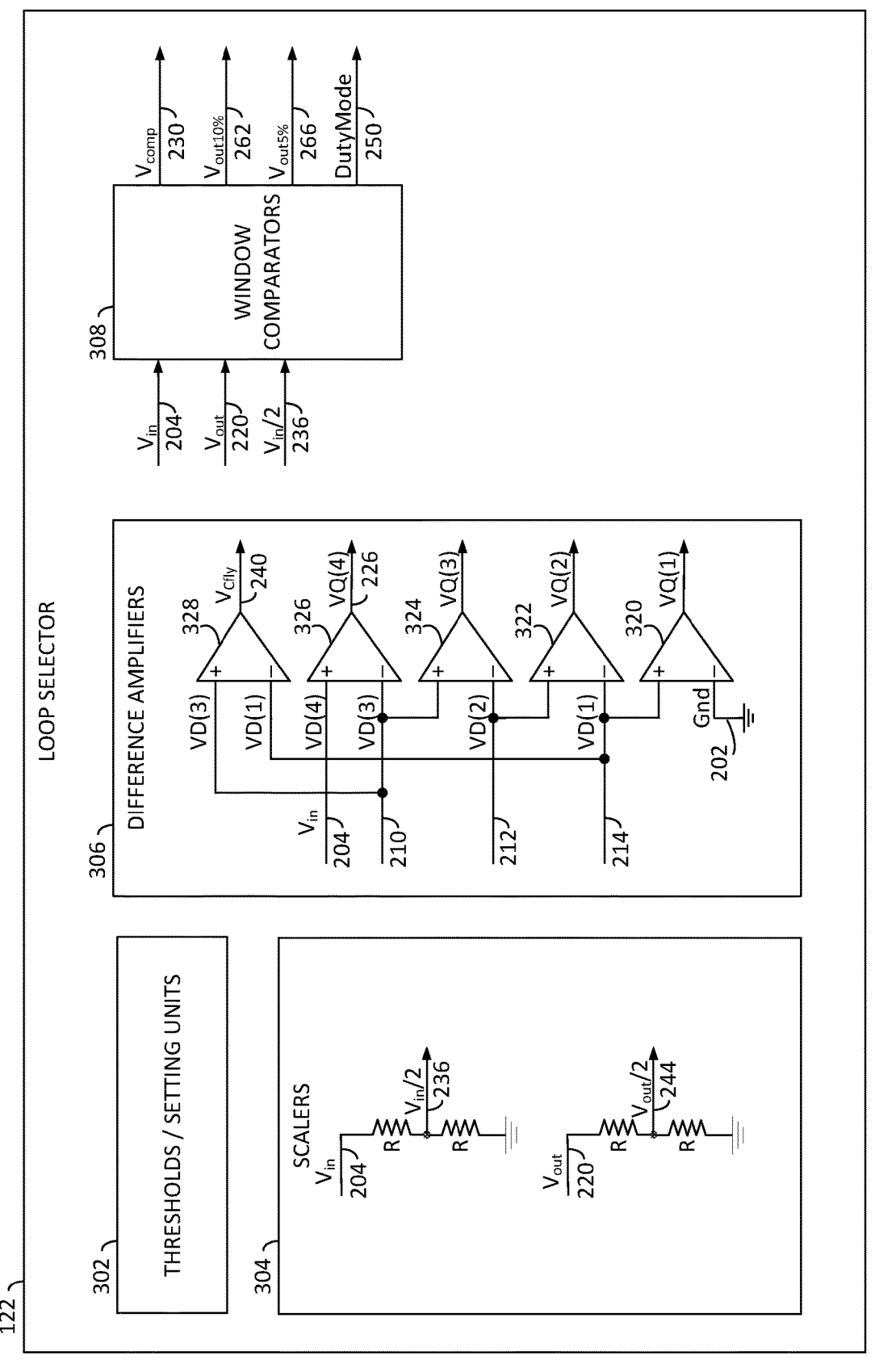
FIG. 3 illustrates a loop selector of a controller for a multilevel power converter, in accordance with various examples of the present disclosure.

FIG. 3 illustrates a loop selector of a controller for a multilevel power converter, in accordance with various examples of the present disclosure. In reference to FIG. 2 and FIG. 3, loop selector 122 may include various components to determine the value of various voltages, including a compensation voltage 230 (Vcomp), a half input voltage 236, a half output voltage 244, a flying capacitor voltage 240 (Vcfly), Vout10% 262 corresponding to Vout being within 10% of Vin/2, Vout5% 266 corresponding to Vout being within 5% of Vin/2, VQ(4:1) 226 corresponding to the voltage differences of VD(4:1) 224, and duty mode 250 corresponding to various operational or duty modes described briefly in reference to FIG. 6.

In one example, loop selector 122 may include a thresholds or setting units block 302 including one or more registers for setting through host computer 160 related to various thresholds or configuration modes that may be used by setting a register value in the one or more registers and used to selectively enable or disable various functions or used to convert the values in the one or more registers to a voltage using a digital-to-analog (D2A) component for some threshold registers instead of computing various values or using discrete components, such as a resistor network, a shifting module, a scaling module, an exponential scaling module, a time integrated scaling module, a window comparator, and the like. Loop selector 122 may also include a plurality of difference amplifiers 306 for computing a voltage difference between various nodes, such as a difference amplifier 328 that may be used to compute the difference between VD(3) node 210 and VD(1) node 214 corresponding to the voltage 240 (Vcfly) across the flying capacitor 218 which spans center two transistors 208. Similarly, a difference amplifier 326 may be used to compute the difference between VD(4) node 204 and VD(3) node 210 corresponding to VQ(4) 226(4), and a difference amplifier 324 may be used to compute the difference between VD(3) node 210 and VD(2) node 212 corresponding to VQ(3) 226(3). Difference amplifier 322 may be used to compute the difference between VD(2) node 212 and VD(1) node 214 corresponding to VQ(2) 226(2). Finally, difference amplifier 320 may be used to compute the difference between VD(1) node 214 and ground node 202 corresponding to VQ(1) 226(1). In this manner, the voltage differences across each of the serial transistors 206 may be used with controller 118, as described herein. Thresholds or setting units block 302 may also include programmable mode selection control to select or enable various features disclosed herein. A mode enable may be included for delaying or suspending advancement of a sequencer based on a count-down timer, for example.

In one example, loop selector 122 may include a plurality of window comparators 308 configured to determine various window-related voltage values, such as a compensating voltage 230 Vcomp (e.g., a control voltage or compensation point) used to set a midpoint of a voltage control window 232 (Vwin). Vcomp 230 may be set in various ways, including setting a register value in threshold setting units 302 or discrete components to establish a midpoint voltage for operation of multilevel power converter 106 in various applications, with an upper voltage window 234 (Vwin+) biased above and a lower voltage window 238 (Vwin−) biased below and corresponding to upper and lower window values based on suitable bias elements.

Window comparators 308 may compute a logic value Vout10% 262 corresponding to when Vout 220 is within 10% of the value of Vin/2 236 and usable by controller 118. Similarly, window comparators 308 may compute a logic value Vout5% 266 corresponding to when Vout 220 is within 5% of the value of Vin/2 236 and usable by controller 118. Alternative computation methods may be used, including a window detector, a dual-edge detector, or setting a value in threshold setting units 302 corresponding to the 10% and 5% values before converting the threshold values to a voltage using an A2D converter, and the like. Finally, window comparators 308 may compute or determine a duty mode 250 corresponding to when the output voltage is above or below a mid-point of half input voltage 236 (Vin/2) by a predetermined amount. In one example, duty mode 250 may be bus value such as an encoding of Vout10% 262 and/or Vout5% 266 corresponding to a high duty mode 602, a mid duty mode 606, and a low duty mode 610 with reference briefly to FIG. 6, where each duty mode is computed based on (e.g., plus or minus) a duty threshold 604 that may be 10% or 5% respectively. Alternatively, duty threshold 604 may be programmable in thresholds setting units 302 to range between about 1% to about 20% in some applications. The relative term "about" is used herein to convey a range of +/−10% of the value. For example, about 1% may range from 0.9% to 1.1%, while about 20% may range from 18% to 22%.

Loop control 126 may include various elements used in the operation of controller 118. For example, loop control 126 may include a difference amplifier 270 configured to compute a voltage error 274 (Verr) based on a difference between flying capacitor voltage 240 and half input voltage 236 (Vin/2). Voltage error 274 may be scaled (e.g. or shifted) by a scale value 282 (Vscale) through two error biasing elements to produce a positive error 276 (Verr+) and a negative error 278 (Verr-) corresponding to the voltage values scaled (e.g., shifted) by the error biasing elements. Voltage error 274 may be either positive or negative, depending on the relative values of flying capacitor voltage 240 (Vcfly) compared with half input voltage 236 (Vin/2). A positive/negative detector 290 may determine whether voltage error 274 is positive or negative (e.g., the sign of the error, depending on the encoding) and output a select signal 292 (Vsel) applied to a voltage multiplexer 294 to select either positive error 276 (Verr+) or negative error 278 (Verr−) as an adjusted voltage 296 (Vadj). Preferably, adjusted voltage 296 (Vadj) may be positive error 276 (Verr+) when voltage error 274 is positive and adjusted voltage 296 (Vadj) may be negative error 278 (Verr−) when voltage error 274 is negative. In this manner, Vadj may be added to a window peak voltage 234 (Vwin+) to modulate window peak voltage 234 based on voltage error 240 and produce a modulated window peak voltage 242 (Vcfly_bal) to balance flying capacitor voltage 240. As used herein, balancing flying capacitor voltage 240 is intended to include alternately adjusting (e.g., selecting) an inductor current peak between two peak threshold values such that the influx of charge to flying capacitor 218 may be controlled. In this manner, the two peak threshold values are determined dynamically.

Output current 222 across inductor 216 is measured by OTA 280 and converted to a reference voltage 288 (Vr) that mimics output current 222. Reference voltage 288 may be compared with modulated peak voltage 242 by difference amplifier 248 to produce a state loop reset 252 applied to a reset input of an SR-Latch 264 which holds a loop state 268 (e.g., a loop state bit) corresponding to the operation of loop control 126 and controller 118. Similarly, voltage reference 288 is compared by difference amplifier 256 with window valley voltage 238 (Vwin−) to produce a state loop set 260 applied to a set input of SR-Latch 264. In this manner, as reference voltage 288 increases and decreases within voltage window 232 (Vwin), state loop reset 252 and state loop set 260 may operate SR-Latch 264 to selectively reset or set loop state 268. In this manner, controller 118 may modulate an inductor peak current into an upper inductor peak current and a lower inductor peak current based on the error voltage, and controller 118 may operate multilevel power converter 106 to produce output current 222 through inductor 216 to converter output 146.

Figure 4:
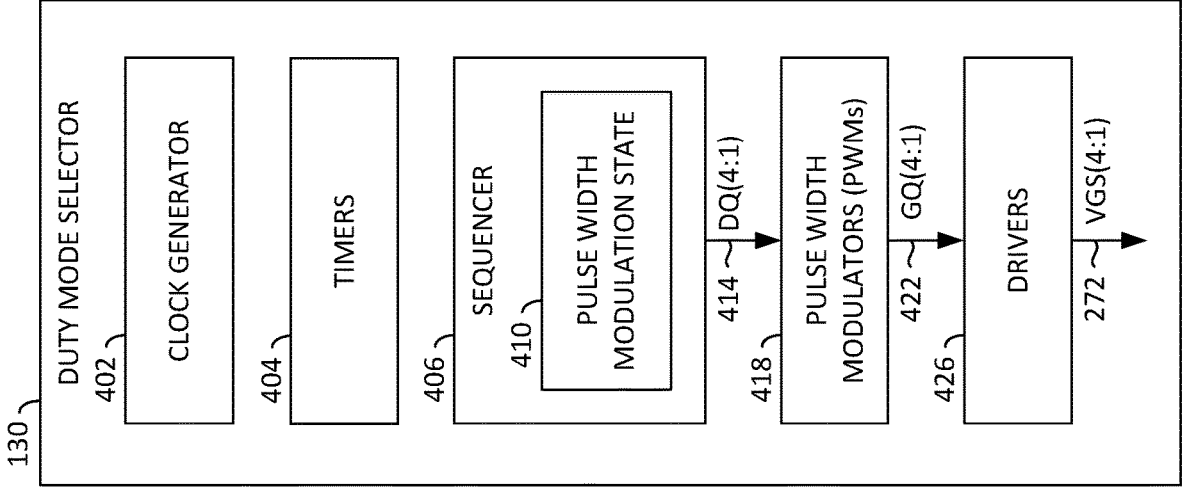
FIG. 4 illustrates a duty mode selector of a controller for a multilevel power converter, in accordance with various examples of the present disclosure.

FIG. 4 illustrates a duty mode selector of a controller for a multilevel power converter, in accordance with various examples of the present disclosure. Duty mode selector 130 may include a clock generator 402 configured to generate one or more clock signals to synchronize operation of controller 118, a plurality of timers 404, a sequencer 406 having a pulse width modulation state 410 (e.g., current state and subsequent state) and a plurality of pulse width modulation state outputs DQ(4:1) 414, corresponding to one output for each of the four transistors 206. Alternatively, Q1 and Q4 drive signals may be complementary, while Q2 and Q3 drive signals may be complementary. Where Q4 is complementary, Q4 may be an inverted version of Q1. Similarly, Q3 may be an inverted version of Q2 to simplify and reduce hardware implementation costs.

Sequencer 406 may be a state machine or counter that may progress through a sequence of pulse width modulation states, to be further described below, and may repeat various pulse width modulation states based on operating conditions of controller 118. Duty mode selector 130 may include a plurality of pulse width modulators 418 configured to receive each of the pulse width modulation state outputs DQ(4:1) 414 and provide a corresponding pulse width modulator output GQ(4:1) 422. In this manner, pulse width modulators 418 may provide a pulse width modulation signal corresponding to pulse width modulation state 410 for each of four transistors 206. Duty mode selector 130 may include a plurality of drivers 426 configured to receive pulse width modulation signals GQ(4:1) 422 and provide corresponding transistor driving signals VGS(4:1) 272 for each of the plurality of transistors 206. One or more timers 404 may include a plurality of count-down timers (alternatively count-up timers) that may be used in some circumstances to pause or delay advancement of sequencer 406 under certain conditions.

Figure 5:
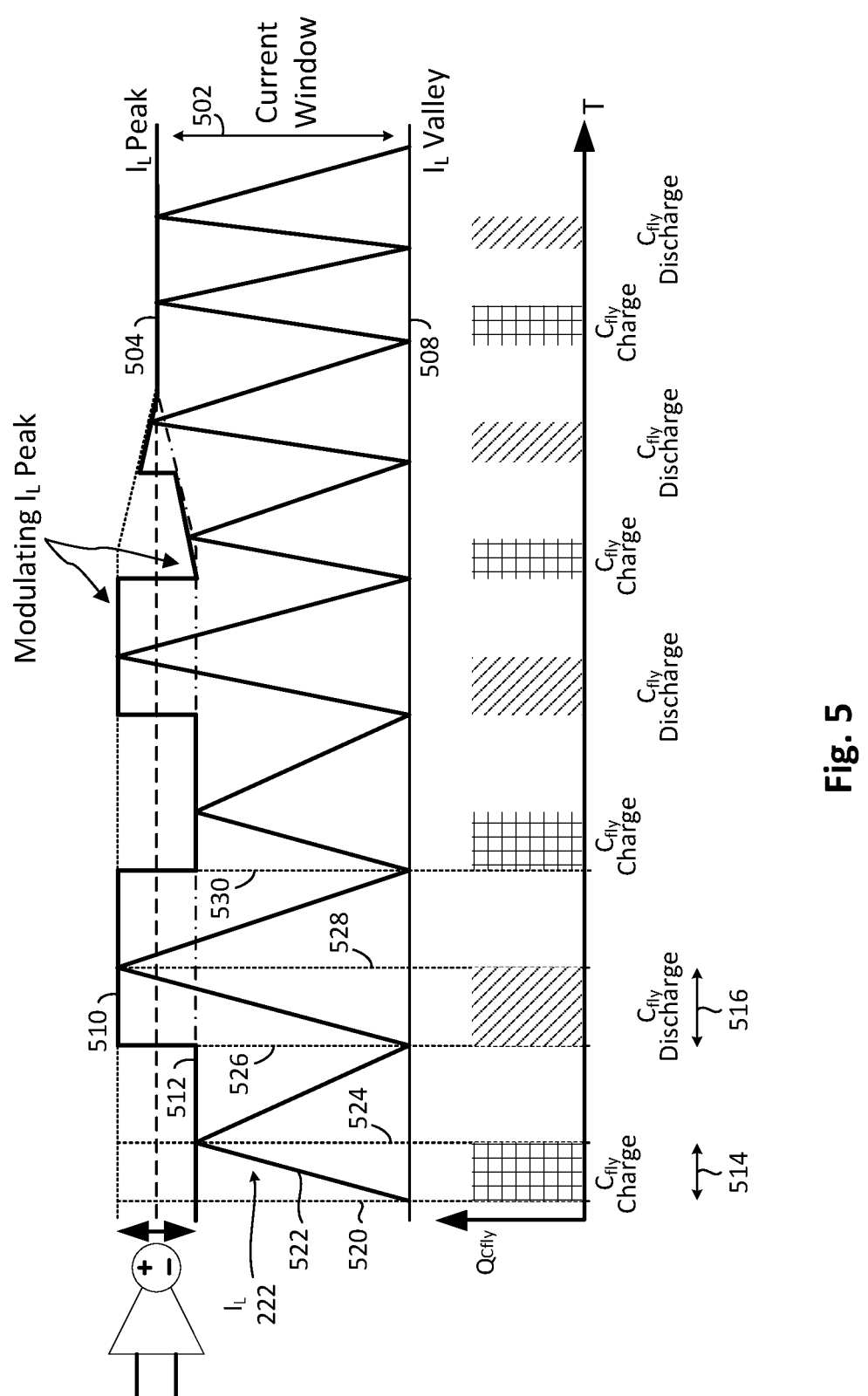
FIG. 5 illustrates a process of flying capacitor balancing, in accordance with various examples of the present disclosure.

FIG. 5 illustrates a process of flying capacitor balancing, in accordance with various examples of the present disclosure. In reference to FIG. 2 through FIG. 5, a process of flying capacitor balancing may include generating a current window 502 corresponding to voltage window 232, where balancing flying capacitor voltage 240 is intended to include alternately adjusting (e.g., selecting, modulating) an inductor peak current 504 ($I_L$ Peak) between an upper peak current 510 and a lower peak current 512 such that the influx of charge to flying capacitor 218 may be controlled. Hence, by modulating upper inductor peak current 510 and lower inductor peak current 512, controller 118 may determine at least one of a charging time 514 and a discharging time 516 of flying capacitor 218.

At a first time 520, in a first pulse width modulation state 410, inductor current 222 ($I_L$) may rise 522 in a substantially linear manner to reach lower inductor peak current 512 at a second time 524 and sequencer 406 may advance to a second pulse width modulation state at which time inductor current 222 may fall in a substantially linear manner to reach a valley inductor current 508 at a third time 526 and forming a substantially triangular waveform. After third time 526, sequencer 406 may advance to a third pulse width modulation state 410 and inductor current 222 may rise to reach upper inductor peak current 510 at time 528. Sequencer 406 may advance to a fourth pulse width modulation state and inductor current 222 may fall to reach valley inductor current 508 at time 530. In this manner, inductor current 222 may be modulated based on error voltage 274 to balance flying capacitor voltage 240 while proceeding through a sequence of pulse width modulation states. After some time, the vertical distance between upper peak inductor current 510 and lower peak inductor current 512 corresponding to voltage error 274 may become less and may eventually become zero indicating flying capacitor voltage 240 is balanced and the two peaks have converged into a single peak. Once error voltage 240 is zero, controller 118 will operate only between a single inductor peak current 504 and the valley inductor current 508.

FIG. 6 is a table illustrating various duty modes corresponding to voltage ranges along with corresponding pulse width modulation states, in accordance with various examples of the present disclosure. In reference to FIG. 2 through FIG. 6, duty mode 250 may correspond to a high duty mode 602 where output voltage 220 (Vout) is greater than half input voltage 236 plus a duty threshold voltage 604, so output voltage resides in an upper region above half input voltage 236 plus duty threshold 604. Duty mode 250 may correspond to a mid duty mode 606 where output voltage 220 is either less than or equal to half input voltage 236 plus duty threshold 604 or greater than or equal to output voltage 220 minus duty threshold 604, so output voltage resides in a middle region above and below half input voltage 236 bounded by duty threshold 604. Finally, duty mode 250 may correspond to a low duty mode 610 where output voltage 220 (Vout) is less than half input voltage 236 minus duty threshold voltage 604, so output voltage resides in an lower region below half input voltage 236 minus duty threshold 604. In this manner, output voltage 220 may be in one of three modes corresponding to three voltage ranges.

When output voltage 220 is in high duty mode 602, sequencer 406 may proceed through PWM states 614 in a sequence of states corresponding to S1-H, and selected lower inductor peak current 512 so that inductor 216 may be magnetizing during pulse width modulation state S1-H, where reference voltage 288 (Vr) has a positive slope, for example. After pulse width modulation state S1-H, sequencer 406 may proceed to state S2-H in high duty mode 602 and selected lower inductor peak current 512 where inductor 216 is demagnetizing, where reference voltage 288 (Vr) has a negative slope, for example, and flying capacitor 218 is charging. After pulse width modulation state S2-H, sequencer 406 may proceed to state S3-H in high duty mode 602 and selected upper inductor peak current 510 where inductor 216 is again magnetizing, where reference voltage 288 (Vr) has a positive slope, for example. Finally, after pulse width modulation state S3-H, sequencer 406 may proceed to state S4-H and upper inductor current peak 510 where inductor 216 is demagnetizing, where reference voltage 288 (Vr) has a negative slope, and flying capacitor 218 is discharging. Controller 118 may continue in high duty mode 602 and return to repeat the sequence of states S1-H through S4-H as long as conditions for operating in high duty mode 602 persist. For example, controller 118 may remain in high duty mode 602 while the output voltage 220 comparison with half input voltage 236 conditions for high duty mode persist.

When output voltage 220 is in mid duty mode 606, sequencer 406 may proceed through PWM states 614 in a sequence of states corresponding to S1-M, and selected lower inductor peak current 512 so that inductor 216 may be magnetizing during pulse width modulation state S1-M, where reference voltage 288 (Vr) has a positive slope, for example. After pulse width modulation state S1-M, sequencer 406 may proceed to state S2-M in mid duty mode 606 and selected lower inductor peak current 512 where flying capacitor 218 is charging. After pulse width modulation state S2-M, sequencer 406 may proceed to state S3-M in mid duty mode 606 and selected upper inductor peak current 510 where inductor 216 is demagnetizing, where reference voltage 288 (Vr) has a negative slope. Finally, after pulse width modulation state S3-M, sequencer 406 may proceed to state S4-M and upper inductor current peak 510 where flying capacitor 218 is discharging. Controller 118 may continue in mid duty mode 606 and return to repeat the sequence of states S1-M through S4-M as long as conditions for operating in mid duty mode 606 persist.

When output voltage 220 is in low duty mode 610, sequencer 406 may proceed through PWM states 614 in a sequence of states corresponding to S1-L, and selected lower inductor peak current 512 so that inductor 216 may be magnetizing, where reference voltage 288 (Vr) has a positive slope, and flying capacitor 218 may be charging during pulse width modulation state S1-M. After pulse width modulation state S1-L, sequencer 406 may proceed to state S2-L in low duty mode 610 and selected lower inductor peak current 512 where inductor 216 is demagnetizing, where reference voltage 288 (Vr) has a negative slope. After pulse width modulation state S2-L, sequencer 406 may proceed to state S3-L in low duty mode 610 and selected upper inductor peak current 510 where inductor 216 is magnetizing, where reference voltage 288 (Vr) has a positive slope, and flying capacitor 218 is discharging. Finally, after pulse width modulation state S3-L, sequencer 406 may proceed to state S4-L and upper inductor current peak 510 where inductor 216 is demagnetizing, where reference voltage 288 (Vr) has a negative slope. Controller 118 may continue in low duty mode 610 and return to repeat the sequence of states S1-L through S4-L as long as conditions for operating in low duty mode 610 persist.

Figure 7:
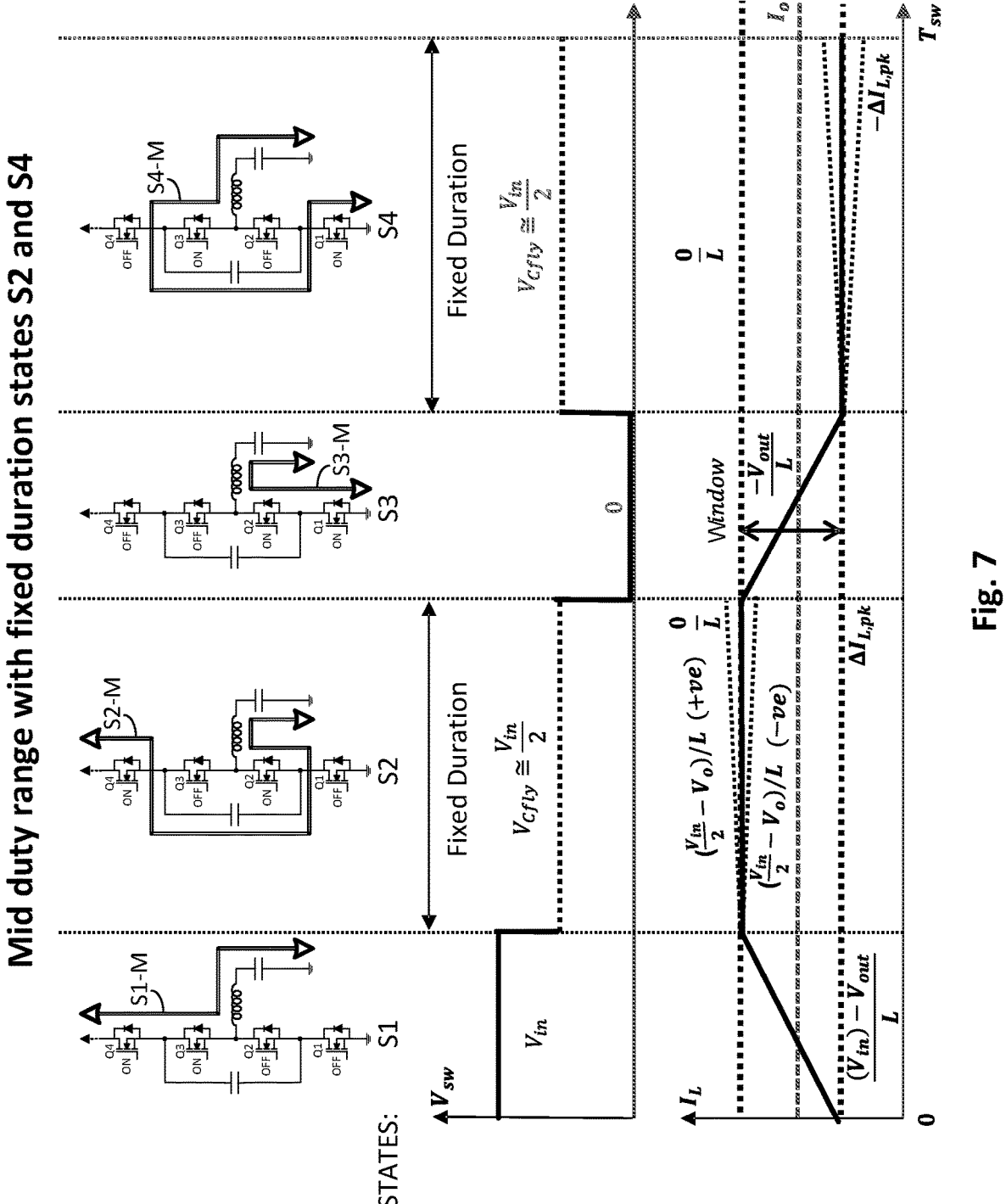
FIG. 7 illustrates a process of mid duty range control, in accordance with various examples of the present disclosure.

FIG. 7 illustrates a process of mid duty range control, in accordance with various examples of the present disclosure. In reference to FIG. 2 through FIG. 7, when output voltage 220 is in mid duty mode 606, sequencer 406 may proceed through PWM states 614 in a sequence of states corresponding to S1-M, and a particular current flow path within power stage 112 corresponding to S1-M, and selected lower inductor peak current 512 so that inductor 216 may be magnetizing during pulse width modulation state S1-M. After pulse width modulation state S1-M, sequencer 406 may proceed to state S2-M in mid duty mode 606 and selected lower inductor peak current 512 where flying capacitor 218 is charging. Instead of advancing based on inductor current 222 reaching a peak or valley threshold, as above, controller 118 may initialize a count-down timer 404 at the start of pulse width modulation state S2-M so that the duration of state S2-M may be a fixed duration. After count-down timer 404 reaches zero in pulse width modulation state S2-M, sequencer 406 may proceed to state S3-M in mid duty mode 606 and selected upper inductor peak current 510 where inductor 216 is demagnetizing. Finally, after pulse width modulation state S3-M, sequencer 406 may proceed to state S4-M and upper inductor current peak 510 where flying capacitor 218 is discharging. Instead of advancing based on inductor current 222 reaching a peak or valley threshold, as above, controller 118 may again initialize a count-down timer 404 at the start of pulse width modulation state S4-M so that the duration of state S4-M may be a fixed duration. The fixed duration of S2-M and S4-M may be equal where timer 404 is initialized to a same starting value. In this manner, controller 118 may be driving a second pulse width modulation state S2-M and a fourth pulse width modulation state S4-M for an equal amount of time. After count-down timer 404 reaches zero in pulse width modulation state S4-M, sequencer 406 may proceed to state S1-M in mid duty mode 606 as long as conditions for operating in mid duty mode 606 persist.

FIG. 7 illustrates the three level switching voltages (Vsw) available in multilevel power converter 106 corresponding to Vin, Vin/2, and 0V and may advantageously allow use of a smaller, lower tolerance, and more economical inductor. As another advantage, transistors 206 may also be smaller than a traditional 2-level converter, leading to a lower voltage across each transistor, lower costs, with reduced switching losses and higher efficiency. In mid duty mode 606, a voltage across inductor 216 may become arbitrarily low and it may become difficult to achieve a desired triangular current, as previously described. To address this issue, FIG. 7 illustrates how extending second state S2-M and S4-M a fixed duration that is longer than S1-M or S3-M may result in a trapezoidal waveform to maintain hysteretic control when inductor current 222 is not traversing between peak and valley.

In reference to FIG. 1 through FIG. 7, according to an example, an apparatus 102 may include a multilevel power converter 106 including a controller 118, four transistors in a series arrangement 206, a flying capacitor 218 configured to span a center two transistors 208 in the series arrangement, and an inductor 216 having a first terminal that is connected to an intermediate node 212 that joins center two transistors 208, each of four transistors in the series arrangement 206 being driven by a pulse width modulation signal 272 from controller 118 based on a sequence of pulse width modulation states 614. Controller 118 may be configured to measure an input voltage 204 at a converter input 144; determine a half input voltage 236 based on the input voltage; measure a flying capacitor voltage 240 across the flying capacitor; determine an error voltage 274 based on a difference between the flying capacitor voltage and the half input voltage; generate an inductor current window 502 having an inductor peak current 504 and a valley inductor current 508; modulate the inductor peak current into an upper inductor peak current 510 and a lower inductor peak current 512 based on the error voltage; and operate the multilevel power converter to produce an output current 222 through the inductor to a converter output 146, the output current being within the inductor current window and based on the sequence of pulse width modulation states.

According to this example, controller 118 may be further configured to alternate the inductor peak current between the upper inductor peak current and the lower inductor peak current based on the sequence of pulse width modulation states to balance the flying capacitor voltage.

In reference to FIG. 1 through FIG. 7, according to another example, an apparatus 102 may include a multilevel power converter 106 including a controller 118, four transistors in a series arrangement 206, a flying capacitor 218 configured to span a center two transistors 208 in the series arrangement, and an inductor 216 having a first terminal that is connected to an intermediate node 212 that joins the center two transistors, each of the four transistors in the series arrangement being driven by a pulse width modulation signal 272 from the controller based on a sequence of pulse width modulation states 614, the controller 118 being configured to measure an input voltage 204 at a converter input 144; measure an output voltage 220 at a converter output 146; determine a half input voltage 236 based on the input voltage; compare the measured output voltage to the half input voltage; determine whether the measured output voltage is within a predetermined percentage of the half input voltage; when the measured output voltage is within the predetermined percentage of the half input voltage corresponding to a mid duty mode 606, the controller is further configured to drive the four transistors in the series arrangement through the sequence of pulse width modulation states 614 that includes a first state (S1-M) corresponding to magnetizing the inductor, a second state (S2-M) corresponding to charging the flying capacitor, a third state (S3-M) corresponding to demagnetizing the inductor, and a fourth state (S4-M) corresponding to discharging the flying capacitor; and operate the multilevel power converter to produce an output current 222 through the inductor to the converter output at the output voltage based on the sequence of pulse width modulation states.

According to this example, controller 118 may be further configured to repeat the sequence of states for the mid duty mode while the measured output voltage is within the predetermined percentage of the half input voltage, wherein the predetermined percentage of the half input voltage is within one of 5% and 10% of the half input voltage, and wherein driving the second state and driving the fourth state correspond to driving for an equal amount of time.

FIG. 8A to FIG. 8B are a flow diagram illustrating a method for operating a multilevel power converter, in accordance with various examples. A method 800 of controlling a multilevel power converter 106 may begin with a step 802 of measuring an input voltage 204 at a converter input 144, the multilevel power converter including four transistors in a series arrangement 206, a flying capacitor 218 configured to span a center two transistors 208 in the series arrangement, and an inductor 216 having a first terminal that is connected to an intermediate node 212 that joins the center two transistors, each of the four transistors in the series arrangement being driven by a pulse width modulation signal 272 based on a sequence of pulse width modulation states 614. Method 800 may continue with a step 804 of determining a half input voltage 236 based on the input voltage 204. Method 800 may continue with a step 806 of measuring a flying capacitor voltage 240 across the flying capacitor. Method 800 may continue with a step 808 of determining an error voltage 274 based on a difference between the flying capacitor voltage and the half input voltage. Method 800 may continue with a step 810 of generating an inductor current window 502 having an inductor peak current 504 and a valley inductor current 508. Method 800 may continue with a step 812 of modulating the inductor peak current into an upper inductor peak current 510 and a lower inductor peak current 512 based on the error voltage. Method 800 may continue with a step 814 of operating the multilevel power converter to produce an output current 222 through the inductor to a converter output 146, the output current being within the inductor current window and based on the sequence of pulse width modulation states.

After step 814, method 800 may continue with a step 816 of alternating the inductor peak current between the upper inductor peak current and the lower inductor peak current based on the sequence of pulse width modulation states to balance the flying capacitor voltage. After step 814, method 800 may continue with step 818 wherein the inductor peak current 504 is based on a window peak voltage 234, and wherein the valley inductor current 508 is based on a window valley voltage 238. After step 818, the method of 800 may continue with step 820 of increasing the window peak voltage by a predetermined amount when the error voltage is positive, and decreasing the window peak voltage by the predetermined amount when the error voltage is negative. After step 820, the method 800 may continue with step 822 of scaling the voltage error in one of a linear, exponential, and a time integrated manner. After step 820, the method 800 may continue with step 824 wherein when the error voltage is zero the upper inductor peak current and the lower inductor peak current are equal. After step 820, the method 800 may continue with step 826 of decreasing the window peak voltage by the predetermined amount in an immediately subsequent pulse width modulation state, and increasing the window peak voltage by the predetermined amount in the immediately subsequent pulse width modulation state. After step 814, method 800 may continue with step 828 wherein the upper inductor peak current and the lower inductor peak current determine at least one of a charging time 514 and a discharging time 516 of the flying capacitor. After step 814, method 800 may continue with step 830 of repeating the sequence of pulse width modulation states.

Figure 9B:
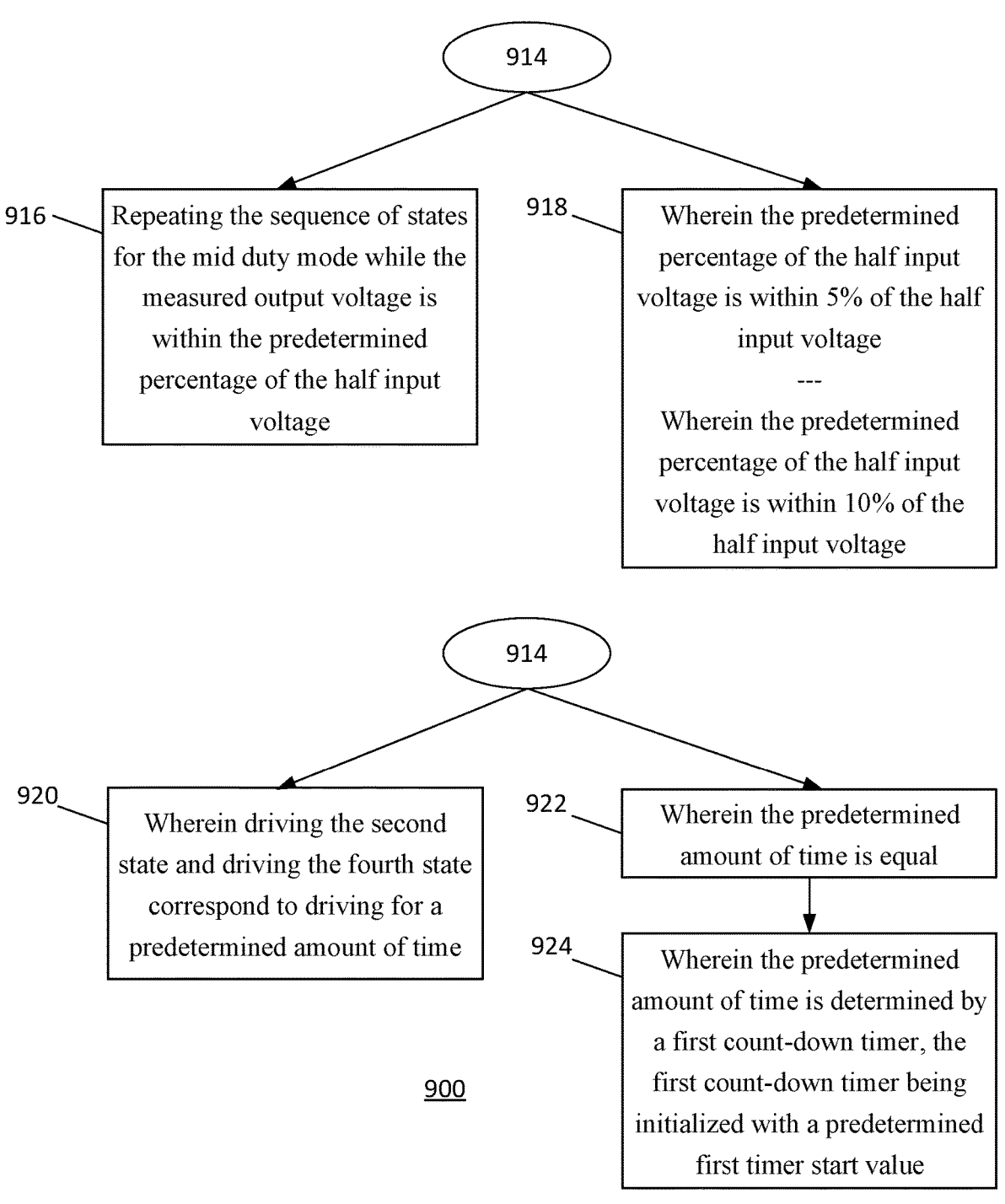

FIG. 9A to FIG. 9B are a flow diagram illustrating a method for operating a multilevel power converter, in accordance with various examples. A method 900 of controlling a multilevel power converter 106 may begin with a step 902 of measuring an input voltage 204 at a converter input 144. Method 900 may continue with step 904 of measuring an output voltage 220 at a converter output 146, the multilevel power converter including four transistors in a series arrangement 206, a flying capacitor 218 configured to span a center two transistors 208 in the series arrangement, and an inductor 216 having a first terminal that is connected to an intermediate node 212 that joins the center two transistors, each of the four transistors in the series arrangement being driven by a pulse width modulation signal 272 based on a sequence of pulse width modulation states 614. Method 900 may continue with step 906 of determining a half input voltage 236 based on the input voltage. Method 900 may continue with step 908 of comparing the measured output voltage to the half input voltage. Method 900 may continue with step 910 of determining whether the measured output voltage is within a predetermined percentage of the half input voltage. Method 900 may continue with step 912 of driving the four transistors in the series arrangement through the sequence of pulse width modulation states that includes a first state (S1-M) corresponding to magnetizing the inductor, a second state (S2-M) corresponding to charging the flying capacitor, a third state (S3-M) corresponding to demagnetizing the inductor, and a fourth state (S4-M) corresponding to discharging the flying capacitor. Method 900 may continue with step 914 of operating the multilevel power converter to produce an output current 222 through the inductor to the converter output at the output voltage based on the sequence of pulse width modulation states.

After step 914, method 900 may continue with step 916 of repeating the sequence of states for the mid duty mode while the measured output voltage is within the predetermined percentage of the half input voltage. After step 914, method 900 may continue with step 918 wherein the predetermined percentage of the half input voltage is within 5% of the half input voltage, or wherein the predetermined percentage of the half input voltage is within 10% of the half input voltage. After step 914, method 900 may continue with step 920 wherein driving the second state and driving the fourth state correspond to driving for a predetermined amount of time. After step 914, method 900 may continue with step 922 wherein the predetermined amount of time is equal. After step 922, method 900 may continue with step 924 wherein the predetermined amount of time is determined by a first count-down timer, the first count-down timer being initialized with a predetermined first timer start value.

FIG. 10A to FIG. 10B are a flow diagram illustrating a method of controlling a multilevel power converter, in accordance with various examples. A method 1000 may begin with a step 1002 of measuring an input voltage 204 at a converter input 144. Method 1000 may continue with a step 1004 of measuring an output voltage 220 at a converter output 146, the multilevel power converter including four transistors in a series arrangement 206, a flying capacitor 218 configured to span a center two transistors 208 in the series arrangement, and an inductor 216 having a first terminal that is connected to an intermediate node 212 that joins the center two transistors, each of the four transistors in the series arrangement being driven by a pulse width modulation signal 272 based on a sequence of pulse width modulation states 614. Method 1000 may continue with step 1006 of determining a half input voltage 236 based on the input voltage. Method 1000 may continue with step 1008 of comparing the measured output voltage to the half input voltage. Method 1000 may continue with step 1010 of determining whether the measured output voltage is within a predetermined percentage of the half input voltage. Method 1000 may 1000 may continue, when the measured output voltage is within the predetermined percentage of the half input voltage corresponding to a mid duty mode, with step 1012 of driving the four transistors in the series arrangement through the sequence of pulse width modulation states (614) that includes a first state (S1-M) corresponding to magnetizing the inductor, a second state (S2-M) corresponding to charging the flying capacitor, a third state (S3-M) corresponding to demagnetizing the inductor, and a fourth state (S4-M) corresponding to discharging the flying capacitor.

Method 1000 may continue with a step 1014 of measuring a flying capacitor voltage across the flying capacitor. Method 1000 may continue with a step 1016 of determining an error voltage based on a difference between the flying capacitor voltage and the half input voltage. Method 1000 may continue with a step 1018 of adjusting a duration of the second state and the fourth state based on the error voltage. Method 1000 may continue with a step 1020 of operating the multilevel power converter to produce an output current 222 through the inductor to the converter output at the output voltage based on the sequence of pulse width modulation states. Method 1000 may continue, wherein the step of adjusting the duration of the second state and the fourth state further comprises one of, with a step 1022 of decreasing the duration of the second state by a predetermined amount of time and increasing the duration of the fourth state by the predetermined amount of time when the error voltage is positive, or increasing the duration of the second state by the predetermined amount of time and decreasing the duration of the fourth state by the predetermined amount of time when the error voltage is negative.

FIG. 11A to FIG. 11D are a flow diagram illustrating a method of controlling a multilevel power converter, in accordance with various examples. A method 1100 may begin with a step 1102 of measuring an input voltage (Vin) at a converter input 144. Method 1100 may continue with a step 1104 of measuring an output voltage (Vout) at a converter output 146, the multilevel power converter including four transistors in a series arrangement 206, a flying capacitor 218 configured to span a center two transistors 208 in the series arrangement, and an inductor 216 having a first terminal that is connected to an intermediate node 212 that joins the center two transistors, each of the four transistors in the series arrangement being driven by a pulse width modulation signal 272 based on a sequence of pulse width modulation states 614. Method 1100 may continue with a step 1106 of determining a half input voltage based on the input voltage (Vin). Method 1100 may continue with a step 1108 of comparing the measured output voltage to the half input voltage. Method 1100 may continue with a step 1110 of determining whether the measured output voltage is one of above a predetermined percentage of the half output voltage and below a predetermined percentage of the half output voltage. Method 1100 may continue, when the measured output voltage is above the predetermined percentage of the half input voltage corresponding to a high duty mode, with a step 1112 of driving the four transistors in the series arrangement through a sequence of pulse width modulation states including a first state (S1-H) corresponding to magnetizing the inductor (reference voltage 288 having a positive slope), a second state (S2-H) corresponding to demagnetizing the inductor (reference voltage 288 having a negative slope) and charging the flying capacitor, a third state (S3-H) corresponding to magnetizing the inductor, and a fourth state (S4-H) corresponding to demagnetizing the inductor and discharging the flying capacitor.

Method 1100 may continue, when the measured output voltage is below the predetermined percentage of the half input voltage corresponding to a low duty mode, with a step 1114 of driving the four transistors in the series arrangement through a sequence of pulse width modulation states including a first state (S1-L) corresponding to energizing the inductor and charging the flying capacitor, a second state (S2-L) corresponding to demagnetizing the inductor, a third state (S3-L) corresponding to magnetizing the inductor and discharging the flying capacitor, and a fourth state (S4-L) corresponding to demagnetizing the inductor. Method 1100 may continue with a step 1116 of operating the multilevel power converter to produce an output current through the inductor to the converter output at the output voltage based on the sequence of pulse width modulation states. After step 1116, method 1100 may continue with a step 1118 of repeating the sequence of pulse width modulation states for the high duty mode while the measured output voltage is higher than a predetermined percentage of the half input voltage. After step 1116, method 1100 may continue with a step 1120 of repeating the sequence of pulse width modulation states for the low duty mode while the measured output voltage is lower than a predetermined percentage of the half input voltage.

After step 1116, method 1100 may continue, when the measured output voltage is below the predetermined percentage of the half input voltage corresponding to a low duty mode, with a step 1122 of starting a second count-down timer when the pulse width modulation state is in a low duty mode first state (S1-L), the second count-down timer being initialized with a predetermined second timer start value. Method 1100 may continue with a step 1124 of determining if the second count-down timer has reached a zero count. Method 1100 may 1100 may continue with a step 1126 of transitioning to a high duty mode second state (S2-H) when the second count-down timer has reached a zero count.

After step 1116, method 1100 may continue, when the measured output voltage is below the predetermined percentage of the half input voltage corresponding to a low duty mode, with a step 1128 of starting a second count-down timer when the pulse width modulation state is in the low duty mode third state (S3-L), the second count-down timer being initialized with a predetermined second timer start value. Method 1100 may continue with a step 1130 of determining if the second count-down timer has reached a zero count. Method 1100 may 1100 may continue with a step 1132 of transitioning to a high duty mode second state (S4-H) when the second count-down timer has reached a zero count.

After step 1116, method 1100 may continue, when the measured output voltage is above the predetermined percentage of the half input voltage corresponding to a high duty mode, with a step 1134 of starting a second count-down timer when the pulse width modulation state is in a high duty mode first state (S1-H), the second count-down timer being initialized with a predetermined second timer start value. Method 1100 may continue with a step 1136 of determining if the second count-down timer has reached a zero count. Method 1100 may 1100 may continue with a step 1138 of transitioning to a low duty mode second state (S2-L) when the second count-down timer has reached a zero count.

After step 1116, method 1100 may continue, when the measured output voltage is above the predetermined percentage of the half input voltage corresponding to a high duty mode, with a step 1140 of starting a second count-down timer when the pulse width modulation state is in a low duty mode third state (S3-H), the second count-down timer being initialized with a predetermined second timer start value. Method 1100 may continue with a step 1142 of determining if the second count-down timer has reached a zero count. The method 1100 may 1100 may continue with a step 1144 of transitioning to a low duty second state (S4-L) when the second count-down timer has reached a zero count.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:
1. A method of controlling a multilevel power converter, the method comprising:
    measuring an input voltage at a converter input, the multilevel power converter including four transistors in a series arrangement, a flying capacitor configured to span a center two transistors in the series arrangement, and an inductor having a first terminal that is connected to an intermediate node that joins the center two transistors, each of the four transistors in the series arrangement being driven by a pulse width modulation signal based on a sequence of pulse width modulation states;
    determining a half input voltage based on the input voltage;
    measuring a flying capacitor voltage across the flying capacitor;
    determining an error voltage based on a difference between the flying capacitor voltage and the half input voltage;
    generating an inductor current window having an inductor peak current and a valley inductor current;
    modulating the inductor peak current into an upper inductor peak current and a lower inductor peak current based on the error voltage; and
    operating the multilevel power converter to produce an output current through the inductor to a converter output, the output current being within the inductor current window and based on the sequence of pulse width modulation states.
2. The method of claim 1, wherein the method further comprises:
    alternating the inductor peak current between the upper inductor peak current and the lower inductor peak current based on the sequence of pulse width modulation states to balance the flying capacitor voltage.
3. The method of claim 1,
    wherein the inductor peak current is based on a window peak voltage, and
    wherein the valley inductor current is based on a window valley voltage.
4. The method of claim 3,
    wherein the step of modulating the inductor peak current into the upper inductor peak current and the lower inductor peak current based on the error voltage further comprises:
        increasing the window peak voltage by a predetermined amount when the error voltage is positive, and
        decreasing the window peak voltage by the predetermined amount when the error voltage is negative.
5. The method of claim 4, wherein the step of increasing the window peak voltage by a predetermined amount and the step of decreasing the window peak voltage by the predetermined amount further comprises scaling the voltage error in one of a linear, exponential, and a time integrated manner.
6. The method of claim 4, wherein when the error voltage is zero the upper inductor peak current and the lower inductor peak current are equal.
7. The method of claim 4,
    wherein when the step of increasing the window peak voltage by a predetermined amount when the error voltage is positive occurs in a current pulse width modulation state, the method further comprises decreasing the window peak voltage by the predetermined amount in an immediately subsequent pulse width modulation state, and
    wherein when the step of decreasing the window peak voltage by a predetermined amount when the error voltage is negative occurs in the current pulse width modulation state, the method further comprises increasing the window peak voltage by the predetermined amount in the immediately subsequent pulse width modulation state.
8. The method of claim 1, wherein the upper inductor peak current and the lower inductor peak current determine at least one of a charging time and a discharging time of the flying capacitor.

9. The method of claim 1, the method further comprising:

repeating the sequence of pulse width modulation states.

10. An apparatus, comprising:

a multilevel power converter including a controller, four transistors in a series arrangement, a flying capacitor configured to span a center two transistors in the series arrangement, and an inductor having a first terminal that is connected to an intermediate node that joins the center two transistors, each of the four transistors in the series arrangement being driven by a pulse width modulation signal from the controller based on a sequence of pulse width modulation states, the controller being configured to:

measure an input voltage at a converter input;

determine a half input voltage based on the input voltage;

measure a flying capacitor voltage across the flying capacitor;

determine an error voltage based on a difference between the flying capacitor voltage and the half input voltage;

generate an inductor current window having an inductor peak current and a valley inductor current;

modulate the inductor peak current into an upper inductor peak current and a lower inductor peak current based on the error voltage; and operate the multilevel power converter to produce an output current through the inductor to a converter output, the output current being within the inductor current window and based on the sequence of pulse width modulation states.

11. The apparatus of claim 10, wherein controller is further configured to:

alternate the inductor peak current between the upper inductor peak current and the lower inductor peak current based on the sequence of pulse width modulation states to balance the flying capacitor voltage.

* * * * *